United States Patent
Mittal et al.

(10) Patent No.: US 7,336,803 B2
(45) Date of Patent: Feb. 26, 2008

(54) METHOD FOR SCENE MODELING AND CHANGE DETECTION

(75) Inventors: Anurag Mittal, Plainsboro, NJ (US); Nikolaos Paragios, Paris (FR); Visvanathan Ramesh, Plainsboro, NJ (US); Antoine Monnet, Paris (FR)

(73) Assignee: Siemens Corporate Research, Inc., Princeton, NJ (US)

( * ) Notice: Subject to any disclaimer, the term of this patent is extended or adjusted under 35 U.S.C. 154(b) by 250 days.

(21) Appl. No.: 10/685,162

(22) Filed: Oct. 14, 2003

(65) Prior Publication Data

US 2005/0286764 A1 Dec. 29, 2005

Related U.S. Application Data

(60) Provisional application No. 60/419,202, filed on Oct. 17, 2002, provisional application No. 60/419,201, filed on Oct. 17, 2002.

(51) Int. Cl.
*G06K 9/00* (2006.01)
(52) U.S. Cl. ............... 382/103; 382/107; 348/169
(58) Field of Classification Search ............ None
See application file for complete search history.

(56) References Cited

U.S. PATENT DOCUMENTS

2003/0058237 A1* 3/2003 Lee ..................... 345/418

OTHER PUBLICATIONS

Simoncelli, Eero, "Bayesian Multi-Scale differential Optical flow" Handbook of Computer Vision and Applications, Academic Press, vol. 2 pp. 397-422.*
"Statistical modeling and performance characterization of a real-time dual camera surveillance system" Greiffenhagen, M.; Ramesh, V.; Comaniciu, D.; Niemann, H.; Computer Vision and Pattern Recognition, 2000. Proceedings. IEEE Conference on vol. 2, Jun. 13-15, 2000 pp. 335-342.*

* cited by examiner

*Primary Examiner*—Jingge Wu
*Assistant Examiner*—Sean Motsinger
(74) *Attorney, Agent, or Firm*—Donald B. Paschburg

(57) ABSTRACT

A method for dynamic scene modeling and change detection applicable to motion analysis utilizes optical flow for capturing and modeling the dynamics of the scene. Uncertainties in the measurements are evaluated and utilized in order to develop a robust representation of the scene in a higher dimensional space. In another embodiment, a dynamical model of the scene is developed that utilizes multiple past frames to predict the next frame. Incremental methods for updating the model are developed and, towards detection of events, a new measure is introduced that is based on a state-driven comparison between the prediction and the actual observation.

3 Claims, 10 Drawing Sheets

FIG. 1
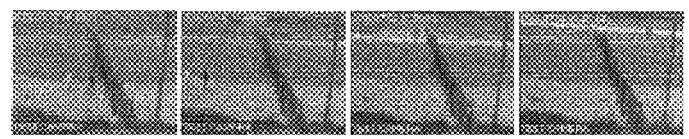
FIG. 2A   FIG. 2B   FIG. 2C   FIG. 2D
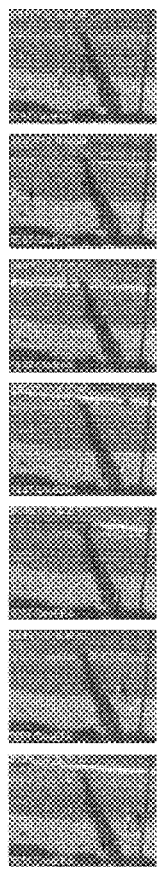 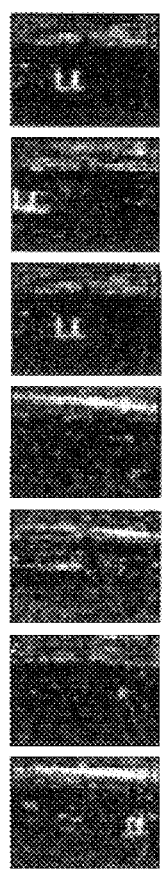 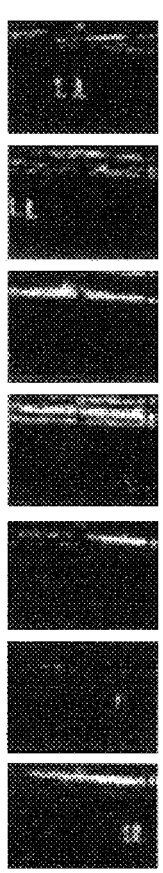 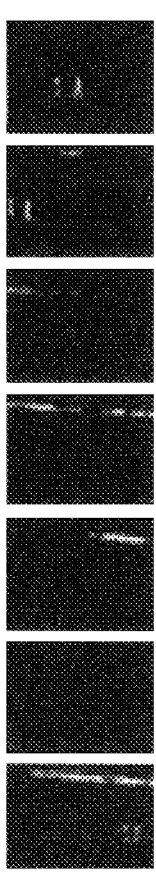

METHOD FOR SCENE MODELING AND CHANGE DETECTION

CROSS-REFERENCE TO RELATED APPLICATIONS

Specific reference is hereby made to Provisional Patent application No. 60/419,202 filed Oct. 17, 2002 and to Provisional Patent application No. 60/419,201 filed Oct. 17, 2002, whereof the benefit of priority is claimed and whereof the disclosures are herein incorporated by reference.

BACKGROUND OF THE INVENTION

The proliferation of cheap sensors and increased processing power have made the acquisition and processing of video information more readily and economically feasible. Real-time video analysis tasks such as object detection and tracking can increasingly be performed efficiently on standard PC's for a variety of applications such as: industrial automation, transportation, automotive, security and surveillance, and communications. The use of stationary cameras is fairly common in a number of applications.

Background modeling and subtraction is a core component in motion analysis. A central idea behind such a module is to create a probabilistic representation of the static scene that is compared with the current input to perform subtraction. Such an approach is efficient when the scene to be modeled refers to a static structure with limited perturbation.

Background subtraction is a core component in many surveillance applications where the objective is to separate the foreground from the static parts of the scene. The information provided by such a module can be considered as a valuable low-level visual cue to perform high-level tasks of object analysis, like object detection, tracking, classification and event analysis. See, for example, Remagnino, P., G. Jones, N. Paragios, and C. Regazzoni: *Video-Based Surveillance Systems: Computer Vision and Distributed Processing*, Kluwer Academic Publishers, 2001; Mittal, A. 203, 2003; Grimson, W., C. Stauffer, R. Romano, and L. Lee: 1998, 'Using adaptive tracking to classify and monitor activities in a site', *IEEE International Conference on Computer Vision and Pattern Recognition*. Santa Barbara, Calif., 1998; Ivanov, Y. and A. Bobick, 'Recognition of Multi-Agent Interaction in Video Surveillance', *IEEE International Conference on Computer Vision*. Kerkyra, Greece, pp. 169-176, 1999; Cohen, I. and G. Medioni, 'Detecting and Tracking Moving Objects in Video Surveillance', *IEEE International Conference on Computer Vision and Pattern Recognition*. Ft. Collins, Colo., pp. II: 319-325; Boult, T., R. Mecheals, X. Gao, and M. Eckmann, 'Into the woods: visual surveillance of non-cooperative and camouflaged targets in complex outdoor settings', *Proceedings of the IEEE* pp. 1382-1402, 2001; Stauffer, C. and W. Grimson, 'Learning Patterns of Activity Using Real-Time Tracking', *IEEE Transactions on Pattern Analysis and Machine Intelligence* 22(8), 747-757, 2000; and Collins, R., A. Lipton, H. Fujiyoshi, and T. Kanade: 2001, 'Algorithms for Cooperative Multi-Sensor Surveillance', *Proceedings of the IEEE* 89(10), 1456-1477, 2001).

A basis for the development of the subspace method for scene prediction is found in the work of Soatto et. al. (Soatto et al., Soatto, S., G. Doretto, and Y. Wu: 2001, 'Dynamic Textures', *IEEE International Conference on Computer Vision*. Vancouver, Canada, pp. II: 439-446, 2001, and in the publication by Doretto, G., A. Chiuso, Y. Wu, and S. Soatto: 2003, 'Dynamic Textures'. *International Journal of Computer Vision* 51(2), 91-109, 2003, including an implementation of their algorithm and an implementation of Incremental PCA due to Silviu Minut.

To this end, one has to obtain a representation of the background, update this representation over time and compare it with the actual input to determine areas of discrepancy.

Such methods have to be adaptive and able to deal with gradual changes of the illumination and scene conditions. Methods for background modeling may be classified into two types: predictive and statistical.

Existing methods in the literature can effectively describe scenes that have a smooth behavior and limited variation. Consequently, they are able to cope with gradually evolving scenes. However, their performance deteriorates (FIG. 2) when the scene to be described is dynamic and exhibits non-stationary properties in time. Examples of such scenes are shown in FIGS. 1 and 10 and include ocean waves, waving trees, rain, moving clouds, etc.

BRIEF SUMMARY OF THE INVENTION

It is herein recognized that, in accordance with the first class of methods, predictive methods attempt to model the scene as a time series and develop a dynamical model to predict the current input based on past observations. The magnitude of the deviation between the predicted and actual observation can then be used as a measure of change.

A second class of methods herein recognized and herein referred to as statistical methods, neglect the order of the input observations and attempt to build a probabilistic representation, that is, a probability density function (p.d.f.) of observations at a particular pixel. A new observation can then be classified as background or foreground based on the probability of this observation belonging to the background.

It is an object of the present invention to provide background modeling techniques of extended scope to include scenes that exhibit a consistent pattern of change of the observation space in the spatio-temporal domain. See, for example, Schodl, A., R. Szeliski, D. Salesin, and I. Essa: 2000, 'Video Textures', *Proceedings of ACM SIGGRAPH Conference*. New Orleans, La., 2000; and Murase, H. and S. Nayar, 'Visual Learning And Recognition Of 3-D Objects From Appearance'. *IJCV* 14(1), 5-24, 1995.

It is a further object of the present invention to address the problem of modeling dynamic scenes where the assumption of a static background is not valid. Waving trees, beaches, escalators, natural scenes with rain or snow are examples.

In accordance with an aspect of the present invention, methods are disclosed for the modeling of such scenes. A first method utilizes optical flow for capturing and modeling the dynamics of the scene. The uncertainties in the measurements are evaluated and utilized in order to develop a robust representation of the scene in a higher dimensional space. A second method, develops a dynamical model of the scene that utilizes multiple past frames to predict the next frame. Incremental methods for updating the model are developed. This second method, follows on work proposed by Doretto et al. (See the above-cited publication by Doretto et al., 2003).

In accordance with another aspect of the present invention, a measure is introduced that is based on a state-driven comparison between the prediction and the actual observation.

In accordance with an aspect of the invention, techniques herein disclosed for background modeling of dynamic scenes include a method comprising a statistical technique and a method comprising a predictive technique.

In accordance with an aspect of the invention, the statistical method utilizes optical flow for capturing and modeling the dynamics of the scene. Along with optical flow, the intensity at a pixel is considered in an illumination-invariant space. Such transformation, as well as optical flow computation, leads to heteroscedastic (point-dependent) noise in the data. These uncertainties in the measurements are evaluated and utilized to develop a robust representation of the scene in a higher dimensional space. Such representation can be built efficiently in a nonparametric manner within a window of past observations. A new observation can then be compared with this representation in order to detect changes.

In accordance with an embodiment of the invention, a method for dynamic scene modeling and change detection applicable to motion analysis utilizes optical flow for capturing and modeling the dynamics of the scene. Uncertainties in the measurements are evaluated and utilized in order to develop a robust representation of the scene in a higher dimensional space. In another embodiment, a dynamical model of the scene is developed that utilizes multiple past frames to predict the next frame. Incremental methods for updating the model are developed and, towards detection of events, a new measure is introduced that is based on a state-driven comparison between the prediction and the actual observation.

In accordance with another aspect of the invention, a method for scene modeling and change detection in an image, comprises the steps of: computing optical flow for the image; performing an invariant transformation such that image pixel intensity is transformed and evaluated in an illumination-invariant space; forming a background model in a high-dimensional space; utilizing results of the computing optical flow and of the invariant transformation as features in the background model; utilizing the background model to estimate probability for a current input to belong to the background; providing a first and a second indication whenever the probability is respectively above and below a given threshold; adding the current input to the image background model whenever the probability is above the threshold; adding the current input to the image background model with a low probability whenever the probability is below the threshold; and performing morphological operations on the pixel-level detection for outputting detection.

In accordance with another aspect of the invention, the background model is developed in a high-dimensional space using kernel density estimation.

In accordance with another aspect of the invention, a method for dynamic scene modeling and change detection applicable to motion analysis, comprises the steps of: making measurements of optical flow and intensities for the dynamic scene; utilizing the optical flow measurements for capturing and modeling the dynamics of the scene; evaluating uncertainties in the measurements; and combining the optical flow measurements, the intensities, and the uncertainties so as to develop a robust representation of the scene in a higher dimensional space.

In accordance with another aspect of the invention, the step of evaluating uncertainties in the measurements comprises the steps of: applying an optical flow constraint equation at a given point defined by a spatial location and time to obtain respective constraints; applying an error function to combine the respective constraints from each the given point within a defined region for deriving a characteristic function; deriving a motion estimate from the characteristic function; and comparing the motion estimate with a given uncertainty model so as to derive a figure of uncertainty for optical flow measurement data.

In accordance with another aspect of the invention, method for dynamic scene modeling and change detection applicable to motion analysis, comprises the steps of: deriving optical flow measurement data for the dynamic scene; deriving intensity data for the dynamic scene; deriving flow covariance matrices for the optical flow measurement data; deriving intensity covariance matrices for the intensity data; applying relevance criteria to the flow and the intensity covariance matrices for selecting relevant features of a subset thereof; and combining the relevant features of the subset for performing detection.

In accordance with another aspect of the invention, a method for dynamic scene modeling and change detection applicable to motion analysis, comprising the steps of: making measurements of intensity; deriving measurements of optical flow for the dynamic scene; building a probability distribution of the intensity and the optical flow in a joint 5-dimensional space comprising 3 color components and 2 flow components; utilizing the optical flow measurements for capturing and modeling the dynamics of the scene; and combining the optical flow measurements, the intensities and the probability distribution so as to develop a robust representation of the scene in a higher dimensional space.

In accordance with another aspect of the invention, apparatus for scene modeling and change detection in an image, compres: apparatus for computing optical flow for said image; apparatus for performing an invariant transformation such that image pixel intensity is transformed and evaluated in an illumination-invariant space; apparatus for forming a background model in a high-dimensional space; apparatus for utilizing results of said computing optical flow and of said invariant transformation as features in said background model; apparatus for utilizing said background model to estimate probability for a current input to belong to the background; apparatus for providing a first and a second indication whenever said probability is respectively above and below a given threshold; apparatus for adding said current input to said image background model whenever said probability is above said threshold; apparatus for adding said current input to said image background model with a low probability whenever said probability is below said threshold; and apparatus for performing morphological operations on said pixel-level detection for outputting detection.

In accordance with another aspect of the invention, apparatus for dynamic scene modeling and change detection applicable to motion analysis, comprises: apparatus for inputting an image of the scene, including previously stored frames thereof; apparatus for dividing the image into blocks, the blocks being represented as respective block vectors; apparatus for forming a current state vector of values derived by forming the dot product of respective ones of the block vectors with the basis vectors; apparatus for deriving an auto-regressive model using state vectors observed for the previously stored frames; and apparatus for testing whether the current state vector can be projected onto the basis vectors and for determining if the current state vector cannot be projected onto the basis vectors, then indicating that a new object is present that is moving differently from its background.

The predictive method treats the image as a time series and develops a predictive model to capture the most important variation based on a sub-space analysis of the signal. work; for background information on this approach, see, for example, Doretto, G., A. Chiuso, Y. Wu, and S. Soatto: 2003, 'Dynamic Textures'. *International Journal of Computer Vision* 51(2), 91-109, 2003. In accordance with an aspect of the invention, the components of this model are used in an autoregressive form to predict the frame to be observed. Differences in the state space between the prediction and the observation quantify the amount of change and are considered to perform detection. Two different techniques are disclosed for maintaining the model: one that update the states in an incremental manner and one that replaces the modes of variation using the latest observation map.

The present description also provides an overview of existing techniques in background modeling and presents the method in accordance with the present invention for background subtraction using optical flow. Thereafter, a description follows of the method in accordance with the present invention for predictive modeling of dynamic scenes in a subspace, followed by a review of the comparative advantages and disadvantages of the statistical and predictive approaches.

These and other aspects of the invention in addition to those described in the foregoing brief summary of the invention will be explained more fully in the detailed description which follows below.

BRIEF DESCRIPTION OF THE SEVERAL VIEWS OF THE DRAWINGS

The invention will be more fully understood from the detailed description of the preferred embodiments which follows, in conjunction with the Drawings, in which FIG. 1 shows frames from an image sequence of an ocean shore, for the purpose of illustrating features of the present invention;

FIG. 2 shows original images (a) and detection results using (b) a mixture of Gaussians model; (c) a non-parametric model; and (d) a non-parametric model with low detection threshold;

DETAILED DESCRIPTION OF THE INVENTION

Figure 3:
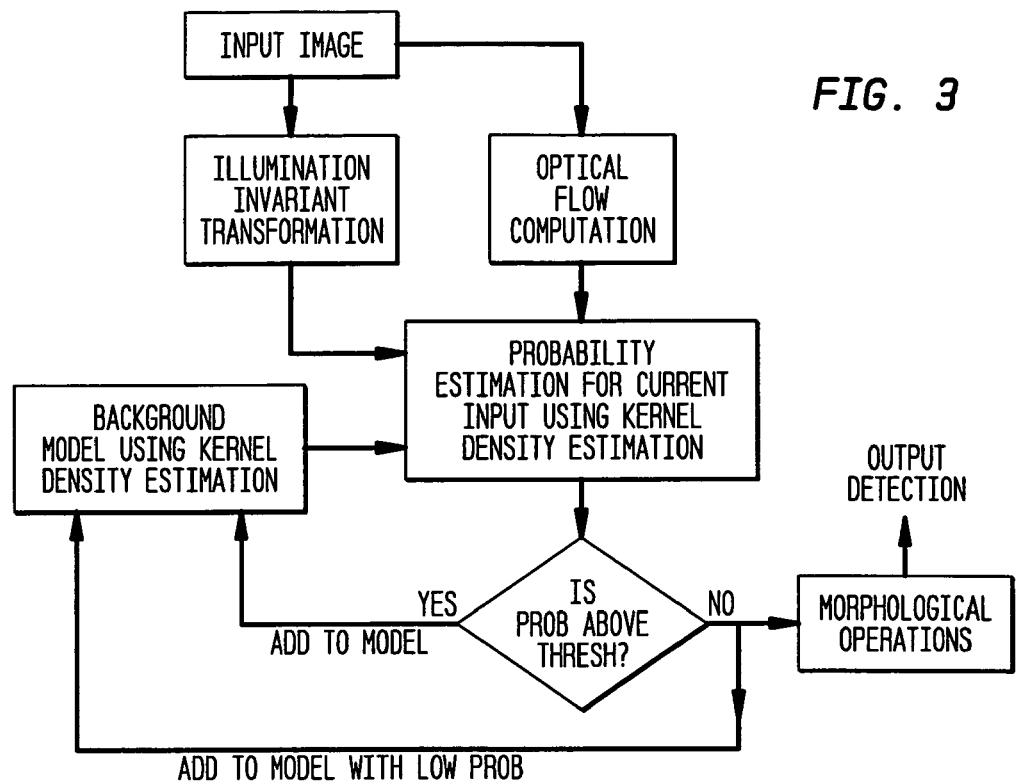
FIG. 3 shows a flowchart relating to an embodiment of the present invention.

In the description of the preferred embodiments of the present invention, existing techniques are first reviewed.

Various methods have been proposed in the literature for developing a pixel-wise statistical representation of the scene of interest. A simple model keeps a single background image. See, for example, Horprasert, T., D. Harwood, and L. Davis, 'A Statistical Approach for Real-time Robust Background Subtraction and Shadow Detection', *Frame-Rate*99, 1999; Ohta, N., 'A Statistical Approach to Background Subtraction for Surveillance Systems', *IEEE International Conference on Computer Vision*, Vancouver, Canada, pp. II: 481-486, 2001; and Greiffenhagen, M., V. Ramesh, D. Comaniciu, and H. Niemann, 'Statistical Modeling and Performance Characterization of a Real-Time Dual Camera Surveillance System', *IEEE International Conference on Computer Vision and Pattern Recognition*. Hilton Head, S.C., pp. II:335-342, 2000. The afore-mentioned discuss methods to perform illumination invariant change detection using such background representation. In line with this direction, a more advanced technique is to keep a running average of the intensity, which would be a computationally efficient approach to provide a rough description of the static scene in the absence of moving objects. Variations of this method include: taking the median of the observed values; calculating spatially weighted values in order to reduce the effect of outliers; and keeping the maximum, minimum and largest consecutive values. See, for example, Haritaoglu, I., D. Harwood, and L. Davis, 'W4: Real-Time Surveillance of People and Their Activities', *IEEE Transactions on Pattern Analysis and Machine Intelligence* 22(8), 809-830, 2000. Such methods do not explicitly model background versus foreground, and therefore they may not be suitable for scenes where many moving objects are present and acquisition of a background image is not easy.

Variations of the visual properties of image observation that correspond to a static scene may be reasonably modeled with a Normal distribution. Under the assumption of zero mean Normal distribution $N(O, \Sigma)$ for the noise in the observation, the pixel intensity may be modeled with a Normal distribution $N(\mu, \Sigma)$. In the publication by Wren, C., A. Azarbayejani, T. Darrell, and A. Pentland, 'Pfinder: Real-Time Tracking of the Human Body', *IEEE Transactions on Pattern Analysis and Machine Intelligence* 19(7), 780-785, 1997), a single Gaussian is considered to model the statistical distribution of a background pixel. Output from their foreground-background classification algorithm can then be used to determine which pixels belong to the background. Such decisions are then used to update the mean $\mu$ and covariance matrix $\Sigma$ of the background Gaussian incrementally.

In the publication by Friedman, N. and S. Russell, 'Image Segmentation in Video Sequences: A Probabilistic Approach', *Proc. of the Thirteenth Conference on Uncertainty in Artificial Intelligence (UAI)*, 1997, a mixture of three Normal distributions is utilized to model the visual properties in traffic surveillance applications. Three hypotheses are considered: road; shadow; and vehicles. The EM algorithm is an optimum method for simultaneously recovering both the parameters of the individual models and the classification of the data into different groups, since this is a "chicken-and-egg" type of problem. However, due to the computational complexity of the algorithm and real-time update requirements of the application, an incremental EM algorithm is considered to learn and update the model parameters. The background (i.e. road), however, is still modeled by a single Gaussian in this case.

In the publication by Stauffer, C. and W. Grimson: 'Adaptive background mixture models for real-time tracking', *IEEE International Conference on Computer Vision and Pattern Recognition*. Ft. Collins, Colo., p. II: 252, 2000, this idea is extended by using multiple Gaussians to model the scene. Such an approach is capable of dealing with multiple hypotheses for the background and can be useful in scenes such as waving trees, beaches, escalators, rain or snow. In order to improve the efficiency of the method, as opposed to EM, the authors propose a simple exponential update scheme for the mixture model. The probability that a certain pixel has intensity $x_t$ at time t is estimated as:

$$p(x_t) = \sum_{i=1}^{k} \frac{w_j}{(2\pi)^{d/2}|\Sigma_j|^{1/2}} \exp\left(-\frac{1}{2}(x_t - \mu_i)^T \Sigma_j^{-1}(x_t - \mu_i)\right)$$

where $w_j$ the weight, $\mu_j$ the mean and $$\Sigma_j = \sigma_j^2 I$$

the covariance matrix for the jth Gaussian are the parameters to be learnt. The k distributions are ordered based on $w_j/\sigma_j^2$ and the first B distributions are used as the model for the background. Here, B is estimated as:

$$B = \underset{b}{\operatorname{argmin}} \left( \frac{\sum_{j=1}^{b} w_j}{\sum_{j=1}^{k} w_j} > T \right)$$

The threshold T is the fraction of the total weight given to the background model. A pixel is assigned to a Gaussian if it is within a distance of $2.5\Sigma$ from its mean. Using this classification, the weights are updated as follows:

$$w_{k,t} = (1-\alpha)w_{k,t-1} + \alpha(M_{k,t})$$

where $\alpha$ is the learning rate and $M_{k,t}$ is 1 for the model which matched and 0 for the remaining models. The model parameters for the matched distribution are updated as follows:

$$w_{k,t} = (1-\alpha)w_{k,t-1} + \alpha(M_{k,t})$$

$$\mu_t = (1-\rho)\mu_{t-1} + \rho X_t$$

$$\sigma_t^2 = (1-\rho)\sigma_{t-1}^2 + \rho(X_t - \mu_t)^T(X_t - \mu_t)$$

where $\rho = \alpha p(X_t | \mu_{k_1} \sigma_{k})$. In the publication by Mittal, A. and D. Huttenlocher: 'Scene Modeling for Wide Area Surveillance and Image Synthesis', *IEEE International Conference on Computer Vision and Pattern Recognition*. Hilton Head, S.C., pp. II: 160-167, 2000, a modification of the above scheme is proposed by the use of constant weighting along with exponential weighting and specify methods to determine the scheme to be used at a particular time. See also Paragios, N. and V. Ramesh, 'A MRF-based Approach for Real-Time Subway Monitoring', *IEEE International Conference on Computer Vision and Pattern Recognition*. Hawaii, pp. I:1034-1040, 2001.

The mixture-of-Gaussians method is quite popular and was to be the basis for a large number of related techniques. See Greiffenhagen, M., V. Ramesh, and H. Niemann, 'The Systematic Design and Analysis Cycle of a Vision System: A Case Study in Video Surveillance', *IEEE International Conference on Computer Vision and Pattern Recognition*. Hawaii, pp. II:704-711, 2001; Mittal, A. and D. Huttenlocher: 2000, 'Scene Modeling for Wide Area Surveillance and Image Synthesis', *IEEE International Conference on Computer Vision and Pattern Recognition*. Hilton Head, S.C., pp. II: 160-167, 2000; Wang, D., T. Feng, H. Shum, and S. Ma: 'A Novel Probability Model for Background Maintenance and Subtraction', *International Conference on Vision Interface*. p. 109, 2002; Javed, O., K. Shafique, and M. Shah: 'A hierarchical approach to robust background subtraction using color and gradient information', *IEEE Workshop on Motion and Video Computing*. Orlando, Fla., pp. 22-27, 2002; and Harville, M.: 'A Framework for High-Level Feedback to Adaptive, Per-Pixel, Mixture-of-Gaussian Background Models', *European Conference on Computer Vision*. Copenhagen, Denmark, p. III: 543 ff., 2002. In the publication by Gao, X., T. Boult, F. Coetzee, and V. Ramesh: 'Error Analysis of Background Adaption', *IEEE International Conference on Computer Vision and Pattern Recognition*. Hilton Head Island, S.C., pp. I: 503-510, 2000, a statistical characterization of the error associated with this algorithm is disclosed.

Parametric methods are a reasonable compromise between low complexity and a fair approximation of the visual scene when it obeys the general assumptions imposed by the selected model. When these assumptions fail, non-parametric approaches are more suitable. A popular non-parametric approach is to use kernels. In this method, a kernel is created around each of the previous samples and the density is estimated using an average over all the kernels:

$$p(x_t) = \frac{1}{n} \sum_{i=1}^{n} K(x_t - x_i)$$

While different kernels can be considered, the Normal kernel was the one that was proposed in the publication by Elgammal, A., D. Harwood, and L. Davis: 'Non-parametric Model for Background Subtraction', *European Conference on Computer Vision*. Dublin, Ireland, pp. II:751-767, 2000 to model the intensity at a particular pixel:

$$p(x_t) = \sum_{i=1}^{n} \frac{1}{(2\pi)^{d/2}|\Sigma|^{1/2}} \exp\left(-\frac{1}{2}(x_t - x_i)^T \Sigma^{-1}(x_t - x_i)\right)$$

The advantage of such an approach is its ability to handle arbitrary shapes of the density function. However, it can be computationally expensive, both in terms of storage requirements and running time.

The background is modeled at the image level in the publication by Oliver, N., B. Rosario, and A. Pentland: 'A Bayesian Computer Vision System for Modeling Human Interactions', *IEEE Transactions on Pattern Analysis and Machine Intelligence* 22(8), 831-843, 2000. Treating images as vectors, the means and variances are collected and Principal component analysis (PCA) over the difference from the mean is performed. Detection is recovered by projection of the input images onto the subspace of basis vectors and thresholding the Euclidean distance between the input image and the projected image (distance from feature space DFFS). It is noted this technique for modeling dynamic scenes will be extend herein, by building a predictive model in the space of PCA basis vectors, in accordance with an aspect of the invention.

In scenes that have a consistent pattern of change over time, such as waves, trees etc., the performance of existing techniques that model only the static characteristics of the scene can be quite unsatisfactory. In terms of the ROC curves, one observes that reducing false alarms can lead to very poor detection rates (FIG. 2). The performance can be improved substantially by explicitly capturing the motion characteristics of the scene and detecting a new object when there is a change in the "pattern of change". Statistical modeling of such motion characteristics is a good compromise when dealing with gradually changing scenes and will be considered in the next section.

It is herein recognized that a possible mechanism to model and account for the motion characteristics of the scene is through the evaluation of optical flow. A brief disclosure of principles of the present invention is first described, followed by a more detailed disclosure of various aspects of the invention as they related to various described embodiments.

There follows first a descriptive overview of a method in accordance with the invention for background modeling that is able to account for dynamic backgrounds that change according to a certain pattern.

FIG. 3 shows a flowchart relating to an embodiment utilizing a non-predictive density-based method in accordance with an aspect of the invention. There follows first a description of a non-predictive density-based method in accordance with an aspect of the invention that neglects the order in which the observations occur. This is a valid assumption when the scene is static or almost static and wherein the changes in the appearance of the background are extremely gradual. In scenes where there is a more drastic change in the background, however, this assumption does not hold. A possible solution or fix to this limitation is to capture the dynamics of the scene using inter-frame motion characteristics. In this section, a method is disclosed based on this idea, in accordance with an aspect of the present invention. Although temporal relationships beyond two frames are still lost, very promising results have been obtained using this technique in accordance with an aspect of the present invention. More complex predictive methods that are able to capture longer term temporal relationships will explained in the next section.

Next, optical flow-based background modeling using variable bandwidth is considered, in accordance with the principles of the invention. Considering first the question of density estimation:

A possible mechanism to model and account for the motion characteristics of the scene is through the evaluation of optical flow. Such flow vectors can be considered to define a multivariate space, along with intensity, and density estimation can be performed in this higher dimensional space for the purpose of object detection.

Several issues need to be addressed in order to obtain robust object detection in this higher-dimensional space. Optical flow estimation can have significant and, possibly directional, errors associated therewith. The one-dimensionality of the spatial image structure causes the so-called aperture problem. The expression refers to the fact that the motion of a moving one-dimensional pattern viewed through a circular aperture is ambiguous. In locations where the spatial gradient vanishes, there is no constraint on the velocity vector. This is often called the blank wall problem. In conjunction with the errors in measuring the temporal derivative and in the optical flow equation (see Verri, A. and T. Poggio: 'Motion Field and Optical Flow: Qualitative Properties'. *IEEE Transactions on Pattern Analysis and Machine Intelligence* 11(5), 490-498, 1989), this leads to heteroscedastic noise where the error in the measurement is point-dependent.

Furthermore, the necessity of considering the visual properties in an invariant space (such as the normalized color space) introduces heteroscedastic noise in the transformed variables. See the above-cited publication by Greiffenhagen et al., 2000. Therefore, the multivariate density in the 5D space (3 for color and 2 for optical flow) must be estimated after properly accounting for and using the uncertainties associated with the measurements.

In accordance with an aspect of the present invention, a novel kernel-based method will next be described for estimating the multivariate probability density that takes into account the errors in both the sample observations and the estimation (test) observation. In such modeling, it is assumed that the uncertainties in the measurements are available. Thereafter, methods to recover such uncertainties will be presented. To this end, methods are herein disclosed for computation of optical flow that make use of and yield the inherent uncertainty in the optical flow computation, methods for estimating the uncertainties in the invariant transformations of the intensity (RGB) and certain assumptions that allow combining the two.

Next, variable bandwidth kernel density estimation is considered. Assuming that flow measurements and their uncertainties are available, a theoretical framework is herein provided for obtaining an estimate of the probability distribution of the observed data in a higher-dimensional space which, in the present case, is 5—two components for the flow and three components for the intensity in the normalized color space.

Several methods—parametric and non-parametric—can be considered for constructing this probability distribution. A mixture of multi-variate Gaussians could be considered to approximate this distribution. The parameters of the model, i.e. the mean and the covariance matrix of the Gaussians, can be estimated and updated in a manner similar to that disclosed in Stauffer, C. and W. Grimson: 'Adaptive background mixture models for real-time tracking', *IEEE International Conference on Computer Vision and Pattern Recognition*. Ft. Collins, Colo., p. II: 252, 1999. Care has to be exercised, however, in dealing with the uncertainties in a correct manner.

A more suitable approach refers to a non-parametric method that has the characteristic of being able to deal with the uncertainties in an accurate manner. The disadvantage of the method is its high computational expense. With the rapid increase in the computational power of processors, an exemplary embodiment of this method in accordance with the present invention is already running in quasi real-time on a 160×120 3-band video on a Pentium IV 2.2 GHz processor machine.

The most common and popular method used in the statistics literature for modeling multivariate probability distributions from sample points is the kernel-based density estimation. See Scott, D.: *Multivariate Density Estimation*, Wiley-Interscience, 1992; and Fukunaga, K.: *Introduction to Statistical Pattern Recognition*. Academic Press, Boston, second edition, 1990. In particular, such selection is quite appropriate when the sample points have variable uncertainties associated with them. Then, the kernel-based approach yields a powerful method for integrating the information available from the samples.

Let $x_1, x_2, \ldots, x_n$ be a set of d dimensional points in $R^d$ and H be a symmetric positive definite d×d matrix (called the bandwidth matrix). Let $K: R^d \rightarrow R^1$ be a kernel satisfying certain conditions that will be defined later.

Then the multivariate fixed bandwidth kernel estimator is defined as (see the above-cited publication by Scott, 1992; and see Wand, M. and M. Jones: *Kernel Smoothing*, Chapman and Hall, 1995):

$$\hat{f}(x) = \frac{1}{n}\sum_{i=1}^{n} K_H(x-x_1) = \frac{1}{n}\sum_{i=1}^{n} \frac{1}{\|H\|^{-1/2}} K(H^{-1/2}(x-x_i)) \quad (1)$$

where $K_H(x) = H^{-1/2} K(H^{-1/2} x)$. The matrix H is the smoothness parameter and specifies the "width" of the kernel around each sample point x.

A well-behaved kernel K must satisfy the following conditions:

$\int_{R^d} K(w)dw=1, \int_{R^d} wK(w)dw=0, \int_{R^d} ww^T K(w)dw = I_d$

The first equation accounts for the fact that the sum of the kernel function over the whole region is unity. The second equation imposes the constraint that the means of the marginal kernels $\{K_i(w_i), i=1, \ldots d\}$ are all zero. The third equation states that the marginal kernels are all pair-wise uncorrelated and that each has unit variance.

It is possible to utilize such an approach for background modeling and for clarity purposes, and the outline of a method that may be employed is herein provided. First, the optical flow is estimated (see Lucas, B. and T. Kanade: 'An Iterative Image Registration Technique with an Application to Stereo Vision', *DARPA*81, pp. 121-130, 1981; and Horn, B. and E. Weldon-Jr.: 'Direct Methods for Recovering Motion'. *International Journal of Computer Vision* 2(1), 51-76, 1988 wherein are disclosed some popular methods) and the intensity is transformed into an invariant normalized color space comprising three dimensions—normalized r=R/(R+G+B) and g=G/(R+G+B), and the average intensity I=(R+G+B)/3. Then, one can build a 5D feature vector x comprising 2 features for the optical flow and 3 features for the intensity in the normalized space. Neglecting the uncertainties in the optical flow and the transformation, the bandwidth matrix H may be specified manually such that the different features are weighted appropriately. For example, the intensity I should be weighted less for robustness to changes in illumination. The probability density can then be estimated from the n previous observations using Equation 1.

Although such a fixed bandwidth approach can be used, use of variable bandwidth usually leads to an improvement in the accuracy of the estimated density. The reason is that a smaller bandwidth is more appropriate in regions of high density since a larger number of samples enables a more accurate estimation of the density in these regions. On the other hand, a larger bandwidth is more appropriate in low density areas where few sample points are available.

It is possible to consider a bandwidth function that adapts to not only the point of estimation, but also the observed data points and the shape of the underlying density. In the literature, two simplified versions have been studied. The first varies the bandwidth at each estimation point and is referred to as the balloon estimator. The second varies the bandwidth for each data point and is referred to as the sample-point estimator. Thus, for the balloon estimator, $$\hat{f}_B(x) = \frac{1}{n}\sum_{i=1}^{n} K_{H(x)}(x-x_i)$$
$$= \frac{1}{n}\sum_{i=1}^{n} \frac{1}{\|H(x)\|^{-1/2}} K(H(x)^{-1/2}(x-x_i))$$

where H(x) is the smoothing matrix for the estimation point x. For each point at which the density is to be estimated, kernels of the same size and orientation are centered at each data point and the density estimate is computed by taking the average of the heights of the kernels at the estimation point. A popular choice for the bandwidth function in this case is to restrict the kernel to be spherically symmetric. Thus, only one independent smoothing parameter remains $h_k(X)$ which is typically estimated as the distance from x to the kth nearest data point. This estimator suffers from several disadvantages—discontinuities, bias problems and integration to infinity.

An alternate strategy is to have the bandwidth matrix be a function of the sample points. This is the sample-point estimator (see the above cited reference to Wand and Jones, 1995; Comaniciu, D.: 2003a, 'An Algorithm for Data-Driven Bandwidth Selection', *IEEE Transactions on Pattern Analysis and Machine Intelligence* 25(2), 2003a; Comaniciu, D., V. Ramesh, and P. Meer: 'The Variable Bandwidth Mean Shift and Data-Driven Scale Selection', *IEEE International Conference on Computer Vision*. Vancouver, Canada, pp. I: 438-445, 2001):

$$\hat{f}_S(x) = \frac{1}{n}\sum_{i=1}^{n} K_{H(x_H)}(x-x_i)$$
$$= \frac{1}{n}\sum_{i=1}^{n} \frac{1}{\|H(x_i)\|^{-1/2}} K(H(x_i)^{-1/2}(x-x_i))$$

The sample-point estimator still places a kernel at each data point, but these kernels each have their own size and orientation regardless of where the density is to be estimated. This type of estimator was introduced by Breiman, L., W. Meisel, and E. Purcell: 'Variable Kernel Estimates of Multivariate Densities'. *Technometrics* 19, 135-144, 1977, who suggested using $H(x_i)=h(x_i)I$ where $h(x_i)$ is the distance from $x_i$ to the k-th nearest data point. Asymptotically, this is equivalent to choosing $h(x^i) \propto f$ $(x_i)^{-1/d}$ where d is the dimension of the data. A popular choice for the bandwidth function, suggested by Abramson (see Abramson, I.: 'On Bandwidth Variation in Kernel Estimates—A Square Root Law', *The Annals of Statistics* 10, 1217-1223, 1982) is to use $h(x_i) \propto f(x_i)\_1=2$ and, in practice, to use a pilot estimate of the density to calibrate the bandwidth function.

A hybrid density estimator is herein introduced, wherein the bandwidth is a function not only of the sample point but also of the estimation point x. The particular property of the data that will be addressed is the availability of the uncertainty estimates of not only the sample points, but also the estimation point x. Let $\{x_i\}_{i=1}^n$ be a set of measurements in d-dimensional space such that each $x_i$ has associated with it a mean $\mu_i$ (in $R^d$) and a d×d covariance matrix $\Sigma i$. Also, let x (with mean $\mu_x$ and covariance $\Sigma_x$) be the current measurement whose probability is to be estimated. We define the multivariate hybrid density estimator as:

$$\hat{f}_H(x) = \frac{1}{n}\sum_{i=1}^n K_{H(x,x_i)}(\mu - \mu_i)$$

$$= \frac{1}{n}\sum_{i=1}^n \frac{1}{\|H(x,x_i)\|^{-1/2}} K(H(x,x_i)^{-1/2}(\mu-\mu_i))$$ (2)

where the bandwidth matrix $H(x; x_i)$ is a function of both the estimation measurement and the sample measurement. Chen, H. and P. Meer: 'Robust Computer Vision through Kernel Density Estimation'. *European Conference on Computer Vision*, Copenhagen, Denmark, pp. I: 236-250, 2002 have suggested using $H_i = x_{i,p}^2 \Sigma_i$ for Epanechnikov kernels for the case where no error in the estimation measurement is available. Expanding on this idea, we propose the use of $H(x,x_i)=\Sigma_{x_i}+\Sigma_x$ as a possible bandwidth matrix for the Normal kernel. Thus, the density estimator becomes:

$$\hat{f}_H(x) == \frac{1}{n(2\pi)^{d/2}} \sum_{i=1}^n \frac{1}{\left\|\sum_{x_i}+\sum_x\right\|^{-1/2}} \exp$$

$$\left(-\frac{1}{2}(\mu-\mu_i)^T\left(\sum_{x_i}+\sum_x\right)^{-1}(\mu-\mu_i)\right)$$ (3)

Given the sample measurements, this estimator is a function of both the mean and the covariance of the estimation measurement. Thus, it is not a density function in the traditional sense which is a function only of the estimation point in d-dimensional space. However, if the covariance matrix $\Sigma x$ is kept fixed, it becomes a proper density function.

This particular choice for the bandwidth function has a strong mathematical foundation. Suppose $x_1$ and $x_2$ are two normally distributed random variables with means $\{\mu_i\}$ and covariance matrices $\{\Sigma i\}$, i.e., $x_i \sim N(\mu_i, \Sigma_i, i=1, 2$. It is well-known that if $x_1$ and $x_2$ are independent, the distribution of $(x_1-x_2)$ is $N(\mu_1-\mu_2, \Sigma_1+\Sigma_2)$. Thus, the probability that $x_1-x_2=0$ or $x_1=x_2$ is $$p(x_t = x_2) = \frac{1}{(2\pi)^{d/2}\left\|\sum_1+\sum_2\right\|^{-1/2}} \exp$$

-continued $$\left(-\frac{1}{2}(\mu_1-\mu_2)^T\left(\sum_1+\sum_2\right)^{-1}(\mu_1-\mu_2)\right)$$

Thus, Equation 3 can be thought of as the average of the probabilities that the estimation measurement is equal to the sample measurement, calculated over all the sample measurements.

The choice for the bandwidth matrix can also be justified by the fact that the directions in which there is more uncertainty either in the estimation measurement or the sample measurements are given proportionately less weightage. Experimentally, the results obtained using this criterion were quite satisfactory and compared favorably with the fixed bandwidth estimator (by neglecting the available covariances altogether) or the balloon/sample-point estimators (by neglecting the uncertainty in the sample or estimation measurements, respectively).

Next, measurement of features and their uncertainties is considered. Towards the introduction of the method for estimating the density function in the presence of uncertainties, it has been assumed that the uncertainties in the measurements are available. Here, the methods that might be used for obtaining the measurements and their associated uncertainties are considered.

Several optical flow algorithms and their extensions can be considered: See Simoncelli, E.: 'Bayesian Multi-scale Differential Optical Flow', *Handbook of Computer Vision and Applications*, Academic Press, Vol. 2. pp. 397-422, 1999; Lucas, B. and T. Kanade: 'An Iterative Image Registration Technique with an Application to Stereo Vision', *DARPA81*. pp. 121-130, 1981; Jr., Horn, B. and E. Weldon-Jr.: 'Direct Methods for Recovering Motion'. *International Journal of Computer Vision* 2(1), 51-76, 1988; Comaniciu, D.: 'Nonparametric Information Fusion for Motion Estimation', *IEEE International*, 2003b; Simoncelli, E., E. Adelson, and D. Heeger: 'probability distributions of optical flow', *IEEE International Conference on Computer Vision and Pattern Recognition*, Mauii, Hi., pp. 310-315, 1991; Weber, J. and J. Malik: 'Robust Computation of Optical-Flow in a Multiscale Differential Framework', *International Journal of Computer Vision* 14(1), 67-81, 1995; Anandan, P.: 'A Computational Framework and an Algorithm for the Measurement of Visual Motion', *International Journal of Computer Vision* 2(3), 283-310, 1989; Szeliski, R.: 'Bayesian Modeling of Uncertainty in Low-Level Vision', *International Journal of Computer Vision* 5(3), 271-302, 1990; Fleet, D. and K. Langley:, 'Recursive Filters For Optical-Flow', *IEEE Transactions on Pattern Analysis and Machine Intelligence* 17(1), 61-67, 1995; and Singh, A. and P. Allen: 'Image-Flow Computation: An Estimation-Theoretic Framework and a Unified Perspective', *Computer Vision, Graphics and Image Processing* 56(2), 152-177, 1992. See Barron, J., D. Fleet, and S. Beauchemin: 'Performance of Optical Flow Techniques'. *International Journal of Computer Vision* 12(1), 43-77, 1994 for a survey and performance analysis of existing methods. The one that is most suitable for the approach in accordance with principles of the present invention and which is described next, has the desired characteristic of being able to determine the error characteristics of the optical flow estimate. The method proposed by Simoncelli (see the above-cited publication by Simoncelli, 1999) is an extension to the method of Lucas and Kanade (see the above-cited publication by Lucas and Kanade, 1981). The basic idea of this algorithm is to apply the optical flow constraint equation (see the above-cited publication by Horn and Weldon-Jr., 1988):

$$\nabla^T g.f + g_t = 0$$

where $\nabla g$ and $g_t$ are the spatial image gradient and temporal derivative, respectively, of the image at a given spatial location and time, and f is the two-dimensional velocity vector. Such an equation puts only one constraint on the two parameters (aperture problem). Thus, a smoothness constraint on the field of velocity vectors is a common selection to address this limitation. If we assume locally constant velocity and combine linear constraints over local spatial regions, a sum-of-squares error function can be defined:

$$E(f) = \sum_i w_i [\nabla^T g(x_i,t) f + g_t(x_i,t)]^2$$

Minimizing this error function with respect to f yields (see the above-cited publication by Simoncelli, 1999) for more details):

$$f = -M^{-1} b$$

where $$M = \sum \nabla g \nabla^T g = \begin{bmatrix} \sum g_x^2 & \sum g_x g_y \\ \sum g_x g_y & \sum g_y^2 \end{bmatrix}, \quad b = \begin{bmatrix} \sum g_x g_t \\ \sum g_y g_t \end{bmatrix}, \quad (4)$$

and all the summations are over the patch.

Simoncelli, (see the above-cited publication by Simoncelli, 1999) introduces a model for the uncertainties in the following way. Defines f as the optical flow, $\hat{f}$ as the actual velocity field, and $n_1$ as the random variable describing the difference between the two. Then:

$$f = \hat{f} + n_1$$

Similarly, let $g_t$ be the actual temporal derivative, and $\hat{g}_t$ the measured derivative. Then:

$$g_t = \hat{g}_t + n_2$$

where $n_2$ is a random variable characterizing the uncertainty in this measurement relative to the true derivative. The uncertainty in the spatial derivatives is assumed to be much smaller than the uncertainty in the temporal derivatives.

Under the assumption that $n_1$ and $n_2$ are normally distributed with covariance matrices $\Lambda_1 = \lambda_1 I$ and $\Lambda_2 = \lambda_2$ (it is scalar), and the flow vector f has a zero-mean Normal prior distribution with covariance $\Lambda p$, the covariance and mean of the optical flow vector can be estimated:

$$\Lambda_f = \left[ \sum_i \frac{w_i M_i}{(\lambda_1 \|\nabla g(x_i)\|^2 + \lambda_2)} + \Lambda_p^{-1} \right]^{-1} \quad (5)$$

$$\mu_f = -\Lambda_f \sum_i \frac{w_i b_i}{(\lambda_1 \|\nabla g(x_i)\|^2 + \lambda_2)}$$

where $w_i$ is a weighting function over the patch, with the points in the patch indexed by i, and $M_i$, and $b_i$ are the same as matrices defined in Equation 4 but without the summation and evaluated at location $x_i$.

In order to handle significant displacements, a multi-scale approach is considered that uses the flow estimates from a higher scale to initialize the flow for a lower level. Towards the propagation of variance across scales, a Kalman filter is used with the normally used time variable replaced by the scale. Refer to the original paper by Simoncelli, (see the above-cited publication by Simoncelli, 1999) for further details.

Estimation of the Covariance Matrix is next considered. The covariance $\Sigma_i$ for each observation $x_i$ (in 5D space) can be derived from the covariances of the components—the normalized color and optical flow. Suppose R, G, and B are the RGB values observed at the pixel. Let S=R+G+B, r=R/S and g=G/S. Assuming that the sensor noise (in RGB space) is normally distributed with a diagonal covariance matrix having diagonal terms $\sigma$, it was shown (see the above-cited publication by Greiffenhagen et al., 2000) that the uncertainties in the normalized estimates r and g can be approximated by:

$$\Sigma_{\hat{r},\hat{g}} = \frac{\sigma^2}{S^2} \begin{pmatrix} \left(1 - \frac{2R}{S} + \frac{3R^2}{S^2}\right) & \left(-\frac{R+G}{S} + \frac{3RG}{S^2}\right) \\ \left(-\frac{R+G}{S} + \frac{3RG}{S^2}\right) & \left(1 - \frac{2G}{S} + \frac{3G^2}{S^2}\right) \end{pmatrix}$$

Assuming that intensity and optical flow features are uncorrelated (which may not be true in general), an expression for $\Sigma_i$ can be derived:

$$\sum_i = \begin{bmatrix} \frac{\sigma^2}{S^2} \begin{pmatrix} \left(1 - \frac{2R}{S} + \frac{3R^2}{S^2}\right) & \left(-\frac{R+G}{S} + \frac{3RG}{S^2}\right) \\ \left(-\frac{R+G}{S} + \frac{3RG}{S^2}\right) & \left(1 - \frac{2G}{S} + \frac{3G^2}{S^2}\right) \end{pmatrix} & \mathbf{0} & \mathbf{0} \\ \mathbf{0} & \sigma_i & 0 \\ \mathbf{0} & 0 & \Lambda_f \end{bmatrix} \quad (6)$$

where $\Lambda_f$ from Equation 5 is used and boldface O's represent the appropriate zero matrices.

Experimental results are next considered. In order to validate the proposed technique, the challenging scene of an ocean front was considered. Such a scene involves wave motion, blowing grass, long-term changes due to tides, global illumination changes, shadows, etc. An assessment on the performance of the existing methods (see the above-cited publications by Grimson et al., 1998; and Elgammal et al., 2000) is shown in FIG. 2. Even though these techniques were able to cope to some extent with the appearance change of the scene, their performance can be considered unsatisfactory for video based surveillance systems.

Figure 13:
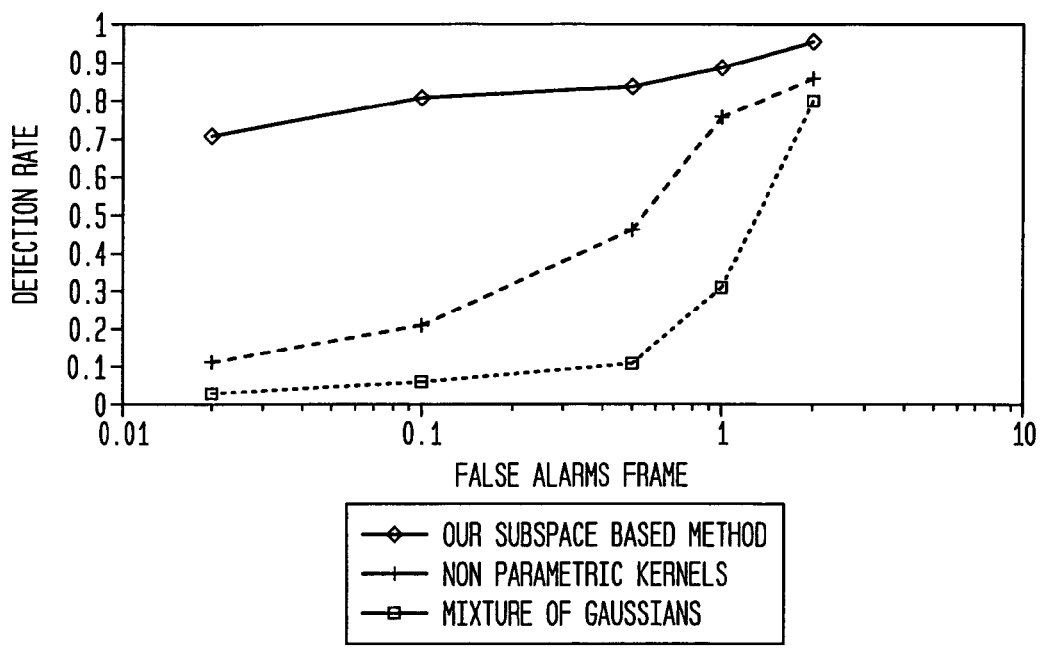
FIG. 13 shows a receiver-operator characteristic (ROC) curves for a sequence for (i) mixture-of-Gaussians model, (ii) non-parametric kernels, and (iii) an embodiment in accordance with the present invention.
Figure 14:
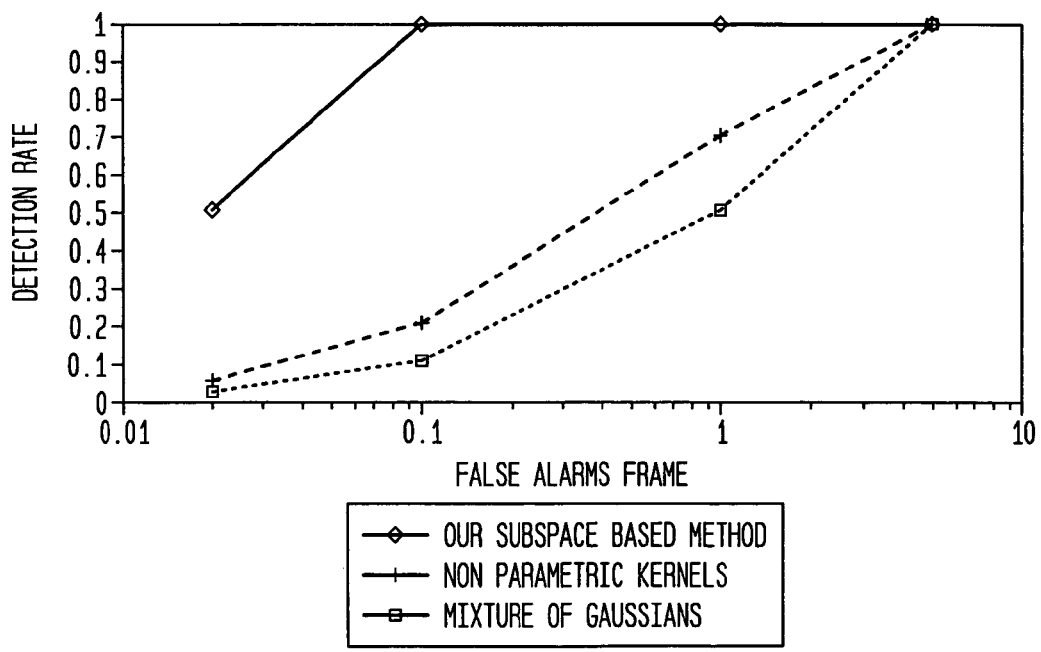
FIG. 14 shows a receiver-operator characteristic (ROC) curves for another sequence for (i) mixture-of-Gaussians model, (ii) non-parametric kernels, and (iii) an embodiment in accordance with the present invention.

The detection of events was either associated with a non-acceptable false alarm rate or the detection was compromised when focus was given to reducing the false alarm rate. The algorithm in accordance with the present invention was able to detect events of interest on the land and simulated events on the ocean front with extremely low false alarm rate as shown in FIGS. 13 and 14.

Based on the experiments, it can be said that the approach in accordance with the present invention was able to capture the dynamic structure of the ocean front as well as the blowing grass. At the same time, dealing with the static parts of the scene is trivial with the proposed framework.

Non-predictive density-based methods neglect the order information in the sample observations. Although the use of inter-frame optical flow in a higher dimensional space mitigates some of the limitations in this approach, longer term temporal relationships are still not captured. In order to overcome this limitation, one can consider predictive methods that try to model the observation as a time series and develop a dynamic model for predicting the current observation based on past ones.

Predictive Methods are next considered. In this section, prior known approaches are surveyed first, mostly based on the linear Kalman filter. Then, a much more complex method in accordance with the present invention is developed based on subspace analysis of the signal. The method is able to capture the long term dynamic characteristics of the scene, temporal and structural relationships between different pixels and multiple modalities of dynamic behavior.

Moreover, the method in accordance with the present invention adapts the detection parameters according to the variation present in the scene leading to a promising tool for change detection in dynamic scenes that exhibit a consistent pattern of change.

Prior work on predictive methods consists of models of varying complexity. Continuous functions of a particular type (e.g. polynomials) may be learnt from past observations and used to model the dynamics of a particular pixel. See the following, Ridder, C., O. Munkelt, and H. Kirchner: 'Adaptive background estimation and foreground detection using Kalman filtering', *Proc. International Conference on recent Advances in Mechatronics,* 193-199, 1995; Karmann, K.-P., A. von Brandt, and R. Gerl: *Signal Processing V: Theories and Application,* Chapt. Moving Object Segmentation based on adaptive reference images. Elsevier, Amsterdam, The Netherlands, 1990; Karmann, K.-P. and A. von Brandt: V Cappellini (ed.), *Time Varying Image Processing and Moving Object Recognition,* Vol. 2, Chapt. Moving Object Recognition Using an Adaptive Background Memory, Elsevier, Amsterdam, The Netherlands, 1990; and Koller, D., J. Weber, and J. Malik: 'Robust Multiple Car Tracking with Occlusion Reasoning', *European Conference on Computer Vision,* Stockholm, Sweden, pp. 189-196, 1994; wherein it is proposed to use a Kalman-filter based dynamical model for each pixel. The Kalman filter tries to estimate the state $x \in R^n$ of a discrete-time controlled process that is governed by the linear stochastic difference equation:

$$x_t = Ax_{t-1} + Bu_t$$

with a measurement $z \in R^n$:

$$z_t = Hx_t$$

Assuming a Gaussian noise model, the parameters of the model can be estimated recursively. It includes a prediction step:

$$\hat{x}_t^- = A\hat{x}_{t-1} + Bu_t, \quad P_t^- = AP_{t-1}A^T + Q$$

where $\hat{x}_t^-$ is the predicted state at time $t_1$, and $P_t$ is the predicted error covariance matrix. Q is the process noise covariance matrix. The measurement update step includes:

$$K_t = P_t^- H^T (HP_t^- H^T + R)^{-1}$$

$$\hat{x}_t = \hat{x}_t^- + K_t(z_t - H\hat{x}_t^-)$$

$$P_t = (I - K_t H)P_t^-$$

where $K_t$ is the Kalman gain matrix and R is the measurement noise covariance matrix. The process is recursive: the previous a posteriori estimates are used to predict the new a priori estimates and the current measurement is used to correct the estimates to obtain a posteriori estimates.

Koller et al. (See the above cited publication by Koller et al., 1994) use a simple state model where the state is a simple 1D value corresponding to the background intensity. The state (background image) is updated differently depending on whether it is hypothesized to be part of the background or not:

$$B_{t+1} = B_t + (\alpha_1(1-M_t) + \alpha_2 M_t)D_t$$

where $B_t$ represents the background model at time t and $D_t$ is the difference between the present frame and the background model. Mt is the binary mask of hypothesized moving objects in the current frame:

$$M_t(x) = \begin{cases} 1 & \|D_t(x)\| > T_t \\ 0 & \text{else} \end{cases}$$

where $T_t$ is the threshold at time t. The gains $\alpha_1$ and $\alpha_2$ are based on an estimate of the rate of change of the background and depend on whether the pixel is hypothesized to be background or foreground.

In the publication by Toyama, K., J. Krumm, B. Brumitt, and B. Meyers: 'Wallflower: Principles and Practice of Background Maintenance', *IEEE International Conference on Computer Vision.* Kerkyra, Greece, pp. 255-261, 1999, a simpler version of the Kalman filter is used, called Weiner filter, that operates directly on the data rather than recursively capturing the essence of past observations in a state vector. Integration of such pixel-level method with region and frame-level information leads to a very promising solution.

It is possible to consider Kalman filters that use more complex state vectors that include an estimate of the velocity or even higher order dynamics of the intensity variation. These linear-filter driven methods would be able to capture the behavior of some simple dynamic backgrounds. However, even such extensions suffer from various limitations: (i) restriction of these filters to linear models and (ii) the lack of ability to capture multiple modalities and complex relationships between neighboring pixels.

Subspace modeling, prediction and subtraction of dynamic scenes are next considered. In this section, a novel approach to modeling dynamic scenes, in accordance with an aspect of the present invention, that learns the dynamical characteristics of the image as a whole (as opposed to pixel-based approaches presented so far). The principle is to learn a predictive model for the scene that is able to predict the next frame based on the current and past observations. Ideas from Doretto et al. (see the above-cited publication by Doretto et al., 2003) are adapted to represent the current state of the scene in an appropriately chosen subspace and to learn the dynamical model of the scene in the state space. Since the model must be learnt online and must adapt to the changing background, an incremental method for adapting the model parameters is developed. Also developed are robust and meaningful measures that allow the present method to detect if the current input deviates from the model prediction in a significant way and thus, should be flagged as "new".

First, an outline of the method in accordance with an embodiment of the invention will be described, followed by a more detailed disclosure, including further considerations and a a more detailed analysis of process in accordance with various embodiments of the invention.

Figure 4:
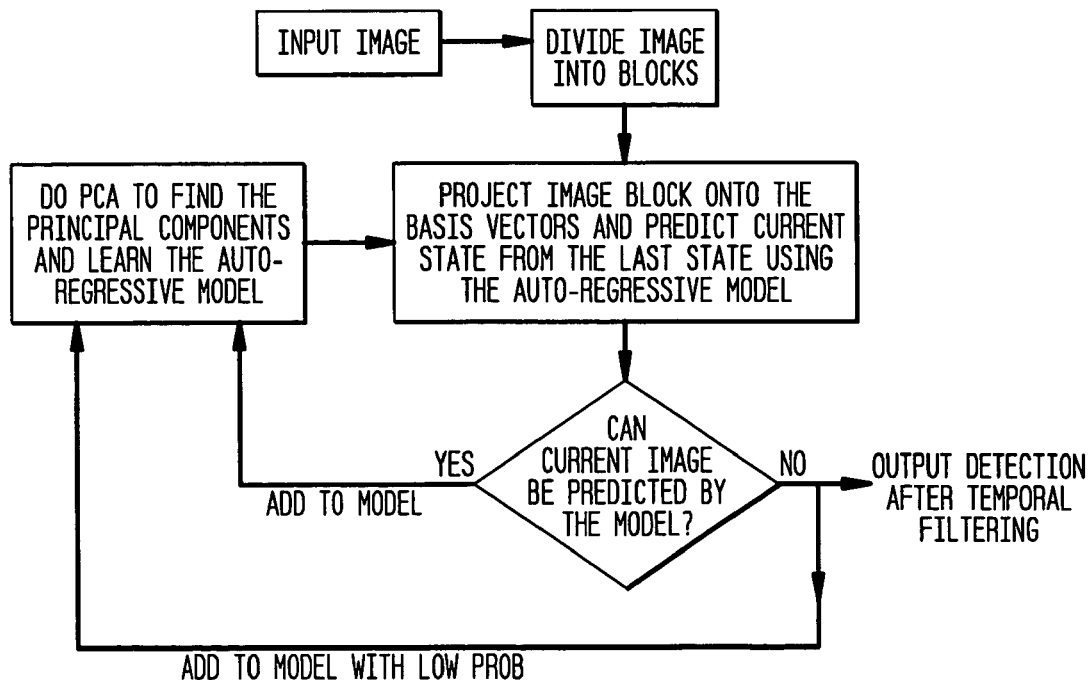
FIG. 4 shows a flowchart relating to another embodiment of the present invention.
Figure 5:
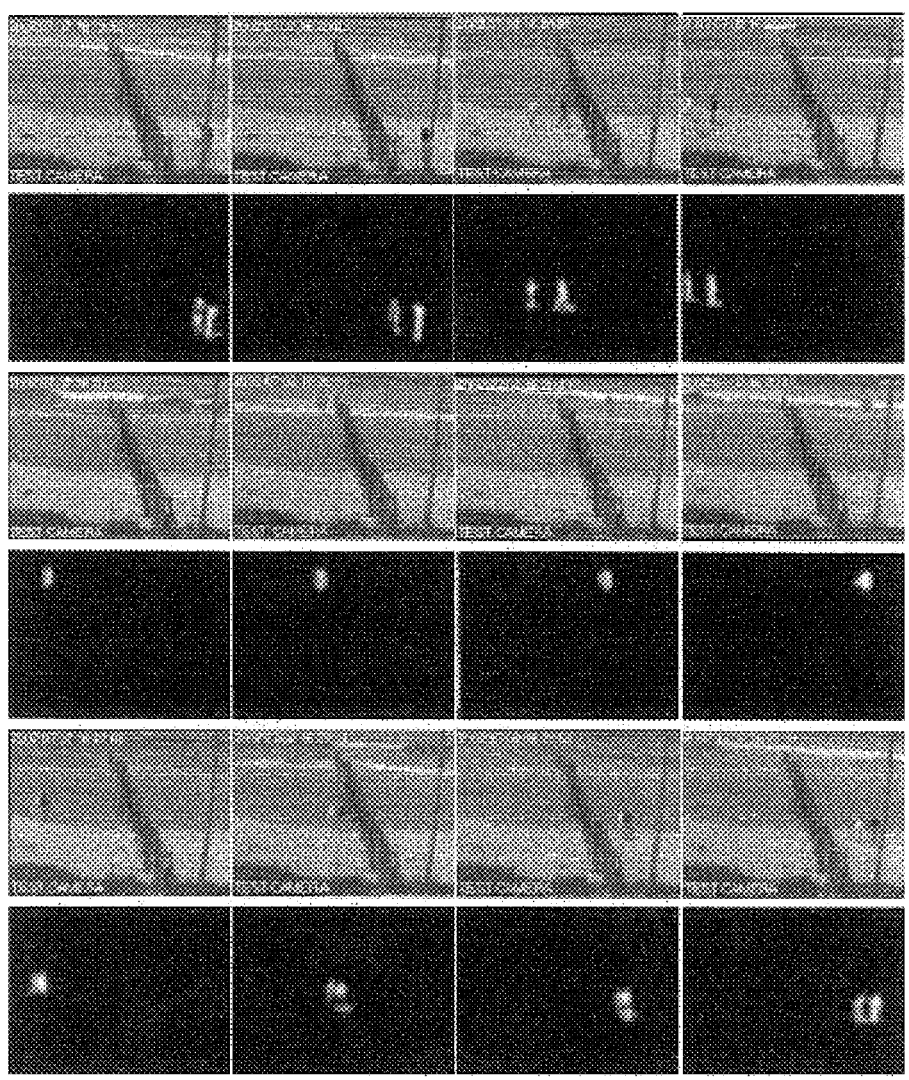
FIG. 5 shows detection results using an optical flow-based method in accordance with an embodiment of the present invention.

FIG. 4 shows a flowchart relating to an embodiment utilizing the principle of learning a predictive model for the scene that is able to predict the next frame based on the current and past observations. An outline of an algorithm in accordance with an aspect of the invention is next disclosed.

The image is divided into blocks, and for each block, PCA is performed using a certain number of previous frames. Regarding PCA, see I. T. Jolliffe: *Principal Component Analysis*, Springler-Verlag, 1986. Each block is treated as a vector and the dot product of the vector with the basis vectors is found. The set of values forms the current state vector (of dimensionality=the number of principal components retained). An auto-regressive model is also learnt using the states observed over time so that the model gives us the state at the current time instant given the states at some previous time instants. For detection, we test whether the current image vector can be projected onto the basis vectors. If it cannot be projected, we say that there is a new object in the scene. We also compare the current state to the predicted state and if the difference is substantial, we say that there is a new object that is moving differently from the background.

There follows next a more detailed description of an embodiment in accordance with the invention.

Scene modeling is next considered. Let $\{I(t)\}_{t=1 \ldots \tau}$ be a given set of images. (In order to achieve insensitivity to changes in illumination, the input may be transformed into a normalized space of S=R+G+B, r=R/S, and g=G/S, and the quantity S divided by an appropriate constant.) A central idea behind the approach in accordance with the present invention is to generate a prediction mechanism that can determine the actual frame using the k latest observed images. Such an objective can be defined in a more rigorous mathematical formulation as follows:

$$I_{pred}(t)=f(I(t-1), I(t-2), \ldots, I(t-k))$$

where f, a k-th order function is to be determined. Quite often, information provided by the input images is rather complex and cannot be used in an efficient manner for prediction. Furthermore, solving the inference problem leads to a high-dimensional search space. In that case, complex techniques and a significant amount of samples are required in order to recover a meaningful solution. One can address this limitation by the use of spatial filter operators. Complexity reduction of the search space and efficient data representation are the outcome of such a procedure. Let $\{\phi_i\}_{i=1}^n$, be a filter bank and $s_1(t)=\phi_i(I(t))$, the output of convolution between the operator $f_i$ and the image I(t). The outcome of such a convolution process can be combined into a vector that represents the current state s(t) of the system.

$$s^T(t)=[s_1(t), \ldots, s_n(t)]$$

Wavelet operators, Gabor filters, anisotropic non-linear filters can be considered. Within the proposed framework in accordance with a described embodiment of the present invention, linear filters are considered. Limited complexity and the existence of efficient algorithms are the main motivation for such selection. Moreover, such filters are able to capture a significant amount of variations in real scenes.

Feature space is next considered. Based on the predictive model that was earlier introduced, a similar concept can be defined in the state space. Similar notation can be considered leading to $$s_{pred}(t)=f(s(t-1),s(t-2), \ldots ,s(t-k))$$

Several techniques can be considered to determine such prediction model. Principal component analysis refers to a linear transformation of variables that retains—for a given number n of operators—the largest amount of variation within the training data. See Arun, K. and S. Kung: 'Balanced Approximations of Stochastic Systems', *SIAM Journal of Matrix Analysis and Applications* 11(1), 42-68, 1990; Jolliffe, I.: 1986, Principal Component Analysis, Springler-Verlag, 1986; de la Torre, F. and M. Black: 'Robust Principal Component Analysis for Computer vision', *IEEE International Conference on Computer Vision*, Vancouver, Canada, pp. I: 362-369, 2001. It is also referred to as the Karhunen-Loeve Expansion (See M. M. Loeve, *Probability Theory*, K. Van Nostrand, Princeton, 1955.) In a prediction mechanism, such a module can retain and recover in an incremental manner the core variations of the observed data.

The estimation of such operators will be addressed in the next section; in order to facilitate the introduction of the method at a concept level, one can consider them known, $$\{b_i=\phi_i\}_{i=1}^n.$$

We consider these operators to produce the state vector s(t):

$$s(t)=[b_1^T \cdot I, b_2^T \cdot I, \ldots, b_n^T \cdot I]^T=B^T I$$

where B=[b1; b2; b3; : : : ; $b_n$] denotes the matrix of basis vectors.

A prediction mechanism is next considered. The next step—given the selected feature space—refers to the modeling and estimation of the prediction function f. In accordance with an aspect of the present invention, one can consider various forms (linear or non-linear) for such prediction mechanism. Non-linear mechanisms involve higher sophistication and can capture more complicated structures. However, the estimation of such functions is computationally expensive and suffers from instability.

It is herein recognized that linear models are a good compromise between low complexity and a fairly good approximation of the observed structure. Auto-regressive models of a certain order k can approximate and predict the actual observation based on the latest k feature vectors. The predicted state will be a linear combination of these vectors:

$$S_{pred}(t) = f(s(t-1), s(t-2), \ldots, s(t-k))$$
$$= \sum_{i=1}^{k} A_i s(t-i)$$

where A is an n×n prediction matrix. Then, prediction in the image space can be computed using the pseudo-inverse of $B^T$.

$$I_{pred}(t) \, pseudoinv(B^T) \cdot s_{pred}(t)$$

where the pseudo-inverse is defined as $$pseudoinv(B^T)=(BB^T)^{-1} \cdot B=B$$

since $BB^T=I$ (The basis vectors are orthogonal and have unit norm). Thus, the unknown variables of the present scene model comprise the basis vectors and the auto-regressive matrix. Visual appearance of indoors/outdoors scenes evolves over time. Global and local illumination changes, position of the light sources, tidal changes, etc. are some examples of such dynamic behavior. One can account for such changes by continuously updating both the basis vectors and the predictive model according to the changes on the observed scene. Last, but not least, the discriminability of the model should be preserved in order to perform accurate detection.

Model construction is next considered. Estimation of the basis vectors from the observed data set can be performed through singular value decomposition. Then one can update such estimation as follows: (i) Considering an observation set that consists of the last m frames and recomputing the SVD based on the new data, (ii) Performing an incremental update of the basis vectors with exponential forgetting where every new frame is used to revise the estimate of these vectors. Similar procedures can be considered when recovering the parameters of the auto-regressive model.

The Estimation of Basis Vectors is next considered. Considering Batch PCA: Let $\{I(t)\}_{t=1\ldots m}$ be a column vector representation of the previous m observations. We assume that the dimensionality of this vector is d. Without loss of generality, a zero mean assumption can be considered for the $\{I(t)\}$ by estimating the mean vector $\mu$ and subtracting from the training samples. Given the set of training examples and the mean vector, one can define the d×d covariance matrix:

$$\Sigma_I = E\{I(t)I^T(t)\}$$

It is well known that the principal orthogonal directions of maximum variation for I(t) are the eigenvectors of $\Sigma_I$. See the above-cited publication by Jolliffe, 1986. Therefore, one can assume that the use of such vectors is an appropriate selection for the filter bank.

One can replace the $\Sigma_I$ with the sample covariance matrix that is given by where $I_M$ is the matrix formed by concatenating the set of images $\{I(t)\}_{t=1\ldots m}$. Then, the eigenvectors of $\Sigma_I$ can be computed through the singular value decomposition (SVD) of $I_M$:

$$I_M = U\Sigma V^T$$

The eigenvectors of the covariance matrix $\Sigma_I$ are the columns of the matrix U while the elements of the diagonal matrix $\Sigma$ refer to the variance of the data in the direction of the basis vectors. Such information can be used to determine the number of basis vectors (n) required to retain a certain percentage of the variance in the data.

Figure 6A:
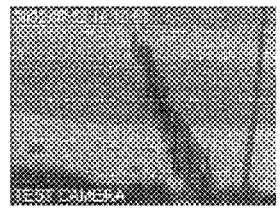
FIG. 6 shows basis vectors in accordance with an embodiment of the present invention, as follows: (a) mean, (b,c) mean+constant×(6 principal) basis vectors, with insignificant vectors represented by a dark color.
Figure 6B:
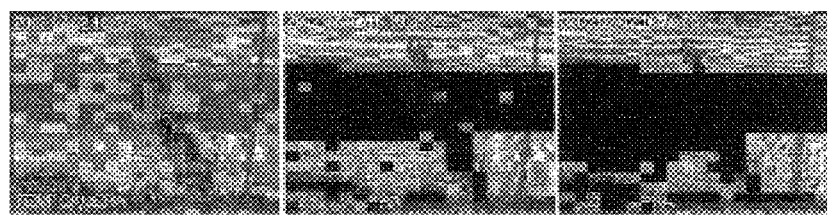
Figure 6C:
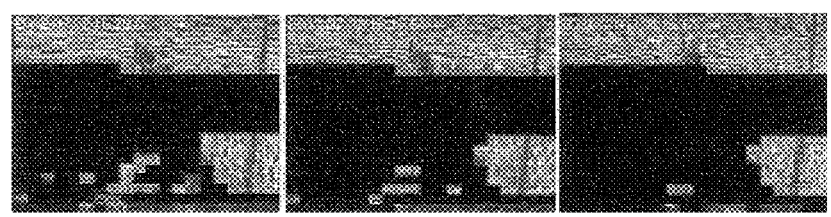
Figure 7A:
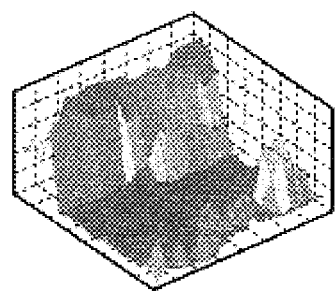
FIG. 7 shows in accordance with an embodiment of the present invention (a) number of retained eigenvectors and (b) magnitude of the largest eigenvalue.
Figure 7B:
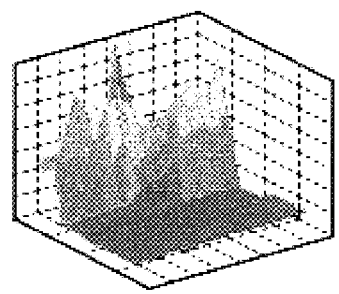
Figure 8A:
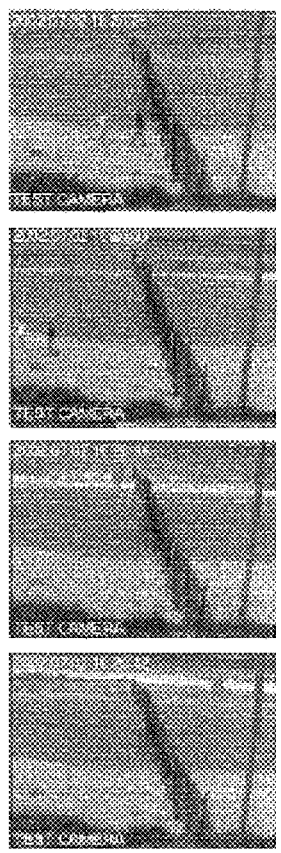
FIG. 8 shows in accordance with an embodiment of the present invention (a) an input signal and (b) a prediction.
Figure 8B:

Examples of retained eigenvectors are shown in FIG. 6. Information related with their magnitude and number are given in FIG. 7. The image is divided into equal size blocks to reduce complexity.

Cosidering Incremental PCA: The batch method is computationally inefficient and cannot be performed at each frame. Therefore, we consider a fast incremental method. In this method, the current estimate of the basis vectors is updated based on the new observation and the effect of the previous observations is exponentially reduced. Several methods for incremental PCA (IPCA) can be considered. See Weng, J., Y. Zhang, and W. Hwang: 2003, 'Candid Covariance-free Incremental Principal Component Analysis', *IEEE Transactions on Pattern Analysis and Machine Intelligence* 25(8), 2003; Oja, E. and J. Karhunen: 'On stochastic approximation of the eigenvectors and eigenvalues of the expectation of a random matrix', *Journal of Mathematical Analysis and Application* 106, 69-84, 1985; Brand, M.: 'Incremental Singular Value Decomposition of Uncertain Data with Missing Values', *European Conference on Computer Vision*. Copenhagen, Denmark, p. I: 707 ff. 2002. A method developed by Weng et al. is adapted to suit the present application. See the afore-mentioned publication by Weng et al.

The Amnesic Mean is next considered. Let $I_1, \ldots I_m$ be the previous m observations. The mean $I_m$ of the images can be computed incrementally:

$$\bar{I}_{m+1} = \left(\frac{m}{m+1}\right) \cdot \bar{I}_m + \left(\frac{1}{m+1}\right) \cdot I_{m+1}$$

This computation gives equal weight to all of the past observations. In order to reduce the effect of previous samples, one can compute the amnesic mean:

$$\bar{I}_{m+1} = \left(\frac{m-l}{m+1}\right) \cdot \bar{I}_m + \left(\frac{1+l}{m+1}\right) \cdot I_{m+1}$$

where l is called the amnesic parameter that determines the rate of decay of the previous samples. If l is a fixed multiple of m ($l=\lambda m$), one obtains exponential decay in the effect of past samples. Typical values of $\lambda$ that were used were between 0.01 and 0.05.

The Update of the Basis Vectors is next considered.

Let $\{b_1, \ldots, b_n\}$ be the current set of estimates of the basis vectors. For reasons that become apparent later, these vectors are not normalized, although they are orthogonal. However, they can be normalized for use in the background model. Also, let m be the number of past observations. Now, suppose we observe a new image $I_{m+1}$. Then, we update the first basis vector $b_1$ by essentially "pulling" it in the direction of $I_{m+1}$ by an amount equal to the projection of $I_{m+1}$ onto the unit vector along $b_1$:

$$b'_1 = \left(\frac{m-l}{m+l}\right) \cdot b_1 + \left(\frac{l+1}{m+1}\right)\left(\frac{b_1 \cdot I_{m+1}}{\|I_{m+1}\|\|b_1\|}\right) \cdot I_{m+1}$$

Here, $$\frac{b_1 \cdot I_{m+1}}{\|b_1\|}$$

is the projection of $I_{m+1}$ in the direction of $b_1$, and $$\frac{I_{m+1}}{\|I_{m+1}\|}$$

is the unit vector in the direction of $I_{m+1}$.

Next, we compute the residue of $R_1$ of $I_{m+1}$ on $b_1$:

$$R_1 = I_{m+1} - Proj_{b_1}(I_{m+1})$$

$$= I_{m+1} - \left(\frac{b_1 \cdot I_{m+1}}{\|b_1\|^2}\right) \cdot b_1$$

This residue is perpendicular to $b_1$ and is used to "pull" $b_2$ in the direction of $R_1$ by an amount equal to the projection of $R_1$ onto the unit vector along $b_2$:

$$b'_2 = \left(\frac{m-l}{m+l}\right) \cdot b_2 + \left(\frac{l+1}{m+1}\right)\left(\frac{b_2 \cdot R_1}{\|R_1\|\|b_2\|}\right) \cdot R_1$$

The residue $R_2$ is calculated similarly:

$$R_2 = R_1 - Proj_{b_2}(R_1)$$

$$= R_1 - \left(\frac{b_2 \cdot R_1}{\|b_2\|^2}\right) \cdot b_2$$

This residue is perpendicular to the span of $<b_1 b_2>$. This procedure is repeated for each subsequent basis vector such that the basis vector bj is pulled towards $I_{m+1}$ in a direction perpendicular to the span of $<b_1 : : : :b_{j-1}>$.

Zhang et al. have proved that, with the above algorithm, $b_i \rightarrow \pm \lambda_i e_i$ as $n \rightarrow \infty$. See Zhang, Y. and J. Weng: 2001, 'Convergence analysis of complementary candid incremental principal component analysis', Technical report, Department of Computer Science and Engineering, Michigan State University, 2001. Here, $\lambda_i$ is the i-th largest eigenvalue of the covariance matrix $\Sigma_I$, and $e_i$ is the corresponding eigenvector. Note that the obtained vector has a scale of $\lambda_i$ and is not a unit vector. Therefore, in our application we store these unnormalized vectors. The magnitude $\lambda_i$ yields the eigenvalue and normalization yields the eigenvector at any iteration.

Estimation of the predictive mode is next considered. Considereing the Batch Update:

As stated earlier, we will use a linear auto-regressive model to model the transformation of states:

$$s_{pred}(t) = \sum_{i=1}^{k} A_i s(t-i)$$

for a k-th order auto-regressive model. The parameters of the model, contained in $A_i$'s, can be recovered if a data set of previous state transformations is available.

We illustrate the approach to be followed in computing the coefficients of the matrices $A_i$ by considering the case of k=1. Let us form two matrices from the state vectors $\{s(t)\}$:

$S2 = [s(2), s(3), \ldots, s(t)]$ $S1 = [s(1), s(2), \ldots, s(t-1)]$

Now, the application of $$s_{pred}(t) = \sum_{i=1}^{k} A_i s(t-i) = A_1 s(t-1)$$

on the state transformations yields an over-constrained set of linear equations. This set of equations can then be solved for the best A in the sense of least squares error $argmin^A \|S2-A S1\|$ by the method of normal equations (See the above-cited publication by Doretto et al., 2003):

$A = S2 \cdot S1^T (S1 \cdot S1^T)^{-1}$

A closed form solution for the best parameters of the auto-regressive model in a least squares sense is possible for any k. This is achieved by solving an over-constrained set of linear equations that are formed by taking each row of the equation $s(t) = \Sigma_i A_i s(t-i)$, where the coefficients of the n×n square matrices Ai are the unknowns. These can be solved using the method of normal equations.

The Incremental Update is next considered.

Updating the auto-regressive model at each time step is a time-consuming process. Incremental methods to update the A matrix are considered to address this limitation. Without loss of generality and for clarity and presentation purpose, we consider an auto-regressive model of order 1. Extension to higher order models is trivially done in a manner similar to the Batch method.

Let us consider the first row $a_1$ of A. This row vector yields the first component of the predicted state vector by a linear combination of the previous state, the elements of the row vector $a_1$ being the unknown coefficients. When we have multiple state transformations available from previous observations, the problem becomes one of incrementally solving an over-constrained set of linear equations $a_1 \cdot s(t) = s_1(t+1), t=1 \ldots T$ where $s_1(t)$ is the first component of the state s(t) at time t.

A traditional approach to an iterative solution of a system of linear equations is through Jacobi iterations or the more commonly used variant—Gauss-Seidel iterations See Golub, G. H. and C. V. Loan: 1996, *Matrix Computations*. John Hopkins University Press, 1996; and Burden, R. L. and J. D. Faires: *Numerical Analysis*, Prindle, Weber and Schmidt Press, Boston, 1985. The idea is to update one unknown variable at a time by rewriting the linear set of equations. Suppose we are trying to solve the 3-by-3 system Ax=b. This can be rewritten as:

$x_1 = (b_1 - a_{12}x_2 - a_{13}x_3)/a_{11}$ $x_2 = (b_2 - a_{21}x_1 - a_{23}x_3)/a_{22}$ $x_3 = (b_3 - a_{31}x_1 - a_{32}x_2)/a_{33}$

Suppose $x^{(k)}$ is an approximation to $x = A^{-1}b$. A natural way to generate a new approximation $x^{(k+1)}$ is to compute $x_1^{(k+1)} = (b_1 - a_{12}x_2^{(k)} - a_{13}x_3^{(k)})/a_{11}$ $x_2^{(k+1)} = (b_2 - a_{21}x_1^{(k)} - a_{23}x_3^{(k)})/a_{22}$ $x_3^{(k+1)} = (b_3 - a_{31}x_1^{(k)} - a_{32}x_2^{(k)})/a_{33}$ This defines the Jacobi iteration for n=3. For general n we have for i=1:n $$x_i^{(k+1)} = \frac{1}{a_{i,i}}\left(b_i - \sum_{j=1}^{i-1} a_{ij}x_j^{(k)} - \sum_{j=i+1}^{n} a_{ij}x_j^{(k)}\right)$$

end

The Jacobi iteration does not use the most recently available information when computing $x_i^{(k+1)}$. The procedure could be revised to always use the most current estimate of $x_i$, leading to the Gauss-Seidel iterations. See the above-cited publication by Burden and Faires, 1985.

Within the traditional approach, n equations available. Thus, the coefficient matrix (A in the system of equations Ax=b) is unchanged. The main reason for using this method, as opposed to the direct method that utilizes matrix inversion, is efficiency when solving very large systems, especially when they are sparse. We will modify this method to make it applicable for iterative update in a system of over-constrained linear equations. Specifically, using Gauss-Siedel iterations, the ith component of $a_1$ is updated at the (k+1)-th step as follows:

$$a_{1,i}^{(k+1)} = \frac{1}{s_i(t)}\left(s_1(t+1) - \sum_{j=1}^{i-1} s_j(t) a_{1,j}^{(k+1)} - \sum_{j=i+1}^{n} s_j(t) a_{1,j}^{(k)}\right)$$

We can rewrite this equation as:

$$a_{1,i}^{(k+1)} = a_{1,i}^{(k)} + \frac{r_i^{(k+1)}}{s_i(t)} \quad (7)$$

where $$r_i^{(k+1)} = s_1(t+1) - \sum_{j=1}^{i-1} s_j(t) a_{1,j}^{(k+1)} - \sum_{j=i+1}^{n} s_j(t) a_{1,j}^{(k)} - s_i(t) a_{1,i}^{(k)}$$

is the residual error. The second term in Equation 7 captures the effect of a new observation. In order to provide robustness to outliers and achieve exponential decay in the effect of past observations, one can modify this update equation as follows:

$$a_{1,i}^{(k+1)} = a_{1,i}^{(k)} + \omega \frac{r_i^{(k+1)}}{s_i(t)} \quad (8)$$

This is similar to the so-called relaxation method, although the for a fixed coefficient matrix, it is used for better convergence.

Choosing $\omega<1$, one obtains an exponential decay in the effect of past observations.

Since only one component of the a vector can be updated at a time, the new observations are used to update one component at a time. Another update with the same equation would give exactly the same result The component to be updated is rotated among the components of a.

A simple mechanism to perform detection is by comparing the prediction with the actual observation. Under the assumption that the auto-regressive model was built using background samples, such technique will provide poor prediction for objects while being able to capture the background. Thus, based on the subspace model for the background, we first predict the new state according to the previous states. The detection task is considered in a 2-dimensional space, $<r_1; r_2>$.

The first component of such space, namely $r_1$, is a fitness measure of the projection of the current vector onto the subspace, given by:

$$r_1(t) = \frac{\|s(t)\|}{\|I(t)\|}$$

Such measure represents the percentage of the original vector captured by the state vector. Low values of such measure have a simple interpretation: the original vector does not lie in the subspace, and may correspond to a new object in the scene. In other words, this is a measure of change of the scene structure. Such case can occur either because of changes in the appearance of the scene (color), or because of structural changes. Such technique can better detect objects to some extent than the standard background subtraction techniques that are pixel-based.

This measure can deal efficiently with changes of appearance in the structural sense but would fail to capture changes in the temporal domain. This can occur when temporal information appears in a different order than the one for the background. To this end, one can consider the relative difference between the current state and the one predicted by the auto-regressive model:

$$r_2(t) = \frac{\|s_{pred}(t) - s(t)\|}{\|s(t)\|}$$

that is normalized by the magnitude of the state vector. Then, decisions on the detection of an event are adaptive to the scale of the state space (input data). Significant values of this error metric indicate the presence of a new object in the scene. Furthermore, such measure captures the change in the motion characteristics. Objects following motion trajectories different than the ones being considered (auto-regressive model) will reflect to important values for $r_2$. Such metric is an additional cue for detection based on structural motion that has not been considered in traditional background adaptation methods (Grimson et al., 1998; Elgammal et al., 2000).

The two measures introduced above can be considered within a detection mechanism in various forms. Thresholding is the simplest one, where the user determines the degree of sensitivity for the system through the threshold values. The selection of such threshold values is a difficult task due to their dependence on the observation set. In order to adapt the thresholding to the data, one can calculate the mean and variance of $r_1$ and $r_2$ and use them to determine the thresholds in an dynamic fashion.

Figure 9A:
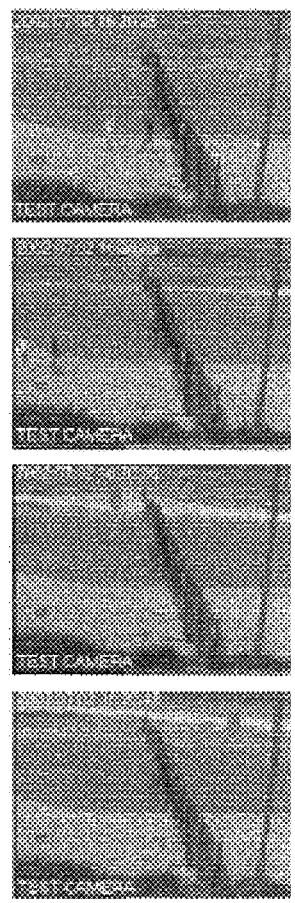
FIG. 9 shows in accordance with an embodiment of the present invention (a) input frames and (b) detection components, wherein in each block pink represents $r_1$, green represents $r_2$, and white represents detection by combining $r_1$ and $r_2$.
Figure 9B:
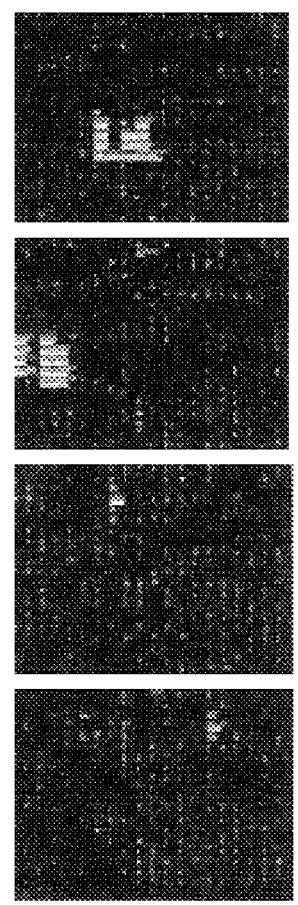

An example of this detection mechanism is shown in FIG. 9. In order to represent the two-dimensional feature space, a color representation was considered where green corresponds to $r_1$ and red to $r_2$. In each block, the length of the color vectors correspond to the magnitude of the detection measures while detection is represented by white color.

In the interest of efficiency and robustness, it is recognized that it is preferable that this comparison of the prediction with the actual observation be performed in the state space and that the statistics of the training data be taken into consideration in the comparison.

Two types of changes in the signal may be considered for detection: (1) "structural" change in the appearance of pixel intensities in a given region, and (2) change in the motion characteristics of the signal. Measures are developed in order to detect each of these types of changes.

In order to develop the approach for estimating structural change in the signal, we begin by reviewing some concepts in Principal Component Analysis and its relationship to density estimation in a multi-dimensional space. Recall that $\tilde{I}$ is a d dimensional vector representation of the mean subtracted input I, such that only n principal components are retained in the subspace. The principal component analysis decomposes the vector space $R^d$ into two mutually exclusive and complementary subspaces: the principal subspace (or feature space) $F=\{b_i\}_{i=1}^n$ containing the principal components and its orthogonal complement $\bar{F}=\{b_i\}_{i=n+1}^d$. Then, using the definition $s = B^T \cdot I$, B being the matrix of basis vectors, the residual reconstruction error for an input vector I(t) is defined as:

$$\epsilon^2(\tilde{I}) = \sum_{i=n+1}^{d} s_i^2 = \|\tilde{I}\|^2 - \sum_{i=1}^{n} s_i^2$$

See K. Fukunaga: *Introduction to Statistical Pattern Recognition*, Academic Press, Boston, second edition, 1990.

This can be easily computed from the first n principal components and the $L_2$-norm of the mean-normalized image I. Thus, the $L_2$ norm of every element $x \in R$ can be decomposed in terms of its projection in these two subspaces. The component in the orthogonal subspace F, referred to as the "distance-from-feature-space" (DFFS), is a simple Euclidean distance equivalent to $\epsilon^2(x)$. See B. Moghaddam and A. P. Pentland: Probabilistic visual learning for object detection, *ICCV*, pages 786-793, Boston, Mass., 1995; and B. Moghaddam and A. P. Pentland: Probabilistic visual learning for object representation, *PAMI*, 19(7):696-710, July 1997.

Let us assume a Gaussian model for the density in high-dimensional space. More complicated models for the density, like mixture-of-Gaussians, or non-parametric approaches can also be considered and easily integrated by explicitly building a background model on the state space. However, for simplicity and ease of use, we will restrict ourselves to Gaussian densities in this paper. If we assume that the mean I and covariance $\Sigma$ of the distribution has been estimated robustly, the likelihood of an input I to belong to the background class $\Omega$ is given by:

$$p(I \mid \Omega) = \frac{1}{(2\pi)^{d/2} |\Sigma_j|^{1/2}} \exp\left(-\frac{1}{2}(I-\bar{I})^T \Sigma^{-1}(I-\bar{I})\right)$$

The sufficient statistic for characterizing this likelihood is the Mahalanobis distance:

$$d(I) = \tilde{I}^T \Sigma^{-1} \tilde{I}$$

where $\tilde{I} = I - \bar{I}$. Utilizing the eigenvalue decomposition of $\Sigma$: $\Sigma := B \Lambda B^T$ where B is the eigenvector matrix of $\Sigma$ and is equal to the matrix of basis vectors B used earlier and $\Lambda$ is the diagonal matrix of eigenvalues ($= D^2$ in Equation 3), the Mahalanobis distance can be written as:

$$d(I) = \tilde{I}^T \Sigma^{-1} \tilde{I}$$
$$= \tilde{I}^T [B \Lambda^{-1} B^T] \tilde{I}$$
$$= s^T \Lambda^{-1} s$$

since $B^T \tilde{I} = s$. Due to the diagonal form of $\Lambda$, we can rewrite this equation as:

$$d(I) = \sum_{i=1}^{d} \frac{s_i^2}{\lambda_i}$$

where $\lambda_i$ is the i-th eigenvalue. If we seek to estimate d(I) using only the n principal projections, one can formulate an optimum estimator for d(I) as follows:

$$\tilde{d}(I) = \sum_{i=1}^{n} \frac{s_i^2}{\lambda_i} + \frac{1}{\rho}\left[\sum_{i=n+1}^{d} s_i^2\right] \quad (9)$$

$$= \sum_{i=1}^{n} \frac{s_i^2}{\lambda_i} + \frac{1}{\rho} \epsilon^2(\tilde{I})$$

where $\epsilon^2(I)$ is the DFFS defined above and can be computed using the first n principal components. In the above-cited publication by Moghaddam et. al. it is shown that an optimal $\rho$ in terms of a suitable error measure based on the Kullback-Leibler divergence is:

$$\rho^* = \frac{1}{d-n} \sum_{i=n+1}^{d} \lambda_i$$

See M. Cover and J. A. Thomas: *Elements of Information Theory*, John Wiley and Sons, New York, 1994.

It is herein proposed that d(I) be used as the first detection measure $r_1$. Such measure can be calculated by utilizing only the first n principal components. It is an optimum measure for estimating the distance from the Gaussian density represented by the principal component analysis such that the covariances of the data are properly taken into account while estimating the difference. High values of such distance measure have a simple interpretation: the original vector is not close to the training data, and may correspond to a new object in the scene. In other words, this is a measure of change of the scene structure. Such case can occur either because of changes in the appearance of the scene (color), or because of structural changes. Therefore, such technique can better detect objects than the standard background subtraction techniques that consider each pixel individually without consideration of the relationships between them.

Change in Motion Characteristics is next considered. The measure $r_1$ can deal efficiently with changes of appearance in the structural sense but would fail to capture changes in the temporal domain. This can occur when temporal information appears in a different order than the one for the background. To this end, one can consider the SSD (Sum of squared differences) error between the input and predicted image, which can be expressed as the square of the $L_2$ norm of the difference between the vectorized input and predicted images: $\|I - I_{pred}\|_2^2$. Since any vector I may be written in terms of its components along the basis vectors, $$I = \sum_{i=1}^{d} s_i B_i,$$

we may write:

$$I - I^{pred} = \sum_{i=1}^{d} s_i B_i - \sum_{i=1}^{d} s_i^{pred} B_i = \sum_{i=1}^{d} \left(s_i - s_i^{pred}\right) B_i$$

Therefore, the norm of this vector may be computed thus:

$$\|I - I_{pred}\|_2^2 = \left\|\sum_{i=1}^{d} \left(s_i - s_i^{pred}\right) B_i\right\|_2^2$$

$$= \sum_{i=1}^{d} \left(s_i - s_i^{pred}\right)^2$$

$$= \sum_{i=1}^{n} \left(s_i - s_i^{pred}\right)^2 + \sum_{i=n+1}^{d} (s_i)^2$$

since the prediction is made from only the first n components, and therefore $s_i^{pred}=0, i=n+1 \ldots d$. Recalling the definition of $\epsilon^2(I)$, we obtain:

$$\|I - I_{pred}\|_2^2 = \sum_{i=1}^{n} \left(s_i - s_i^{pred}\right)^2 + \epsilon^2(\tilde{I})$$

Again, this quantity may be computed from only the first n components. Since the effect of the second term has already been captured in $r_1$, we define $$r_2(t) = \sum_{i=1}^{n} \left(s_i - s_i^{pred}\right)^2 = \|s - s^{pred}\|_2^2$$

where the state vectors are considered only up to the n principal components. Significant values of this error metric indicate the presence of a new object in the scene. Furthermore, such measure captures the change in the motion characteristics. Objects following motion trajectories different than the ones being considered (auto-regressive model) will reflect to important values for $r_2$. Such metric is an additional cue for detection based on structural motion that has not been considered in traditional background adaptation methods. See W. E. L. Grimson, C. Stauffer, R. Romano, and L. Lee: Using adaptive tracking to classify and monitor activities in a site, *CVPR*, Santa Barbara, Calif., June 1998; and the above-cited paper by A. Elgammal et al., 2000.

Implementation and experiments are next considered.

Real-time processing is a standard requirement of video surveillance. In particular, when dealing with techniques that are aimed at background adaptation, such a requirement is strictly enforced. Changes of the background structure should be captured from the model to preserve satisfactory detection rate.

Computing the basis components for large vectors is a time consuming operation. Optimal algorithms for singular value decomposition of an m×n matrix take $O(m^2n+n^3)$ time. See G. H. Golub and C. F. Van Loan: *Matrix Computations*, John Hopkins University Press, 1996.

A simple way to deal with such complexity is by considering the process at a block level. To this end, we divide the image into blocks and run the algorithm independently on each block. For each of these blocks, the number of components retained is determined dynamically by the singular values (which refer to the standard deviation in the direction of basis vectors). Also determined by the singular values is the number of past images over which the SVD is computed (for the non-incremental method). This is because higher variation in a region suggests that more images would be required to model it. Furthermore, we compute the PCA only over those frames that are not well modeled by the current basis vectors. This enables us to capture the variation of the data over a much longer time window with the same computational cost.

Such mechanism leads to a quasi real-time (~5 fps) implementation for a 340×240 3-band video stream on a 2.2 GHz Pentium IV processor machine.

In order to validate the proposed technique, experiments were conducted on two different types of scenes. First, results are shown on the challenging scene of the ocean front. Such a scene involves wave motion, blowing grass, long-term changes due to tides, global illumination changes, shadows, etc. An assessment on the performance of the existing methods is shown in FIG. 2. See the afore-cited publications by C. Stauffer et al. and A. Elgammal et al., 2000. Even though these techniques were able to cope to some extent with the appearance change of the scene, their performance can be considered unsatisfactory for video based surveillance systems.

Figure 10:
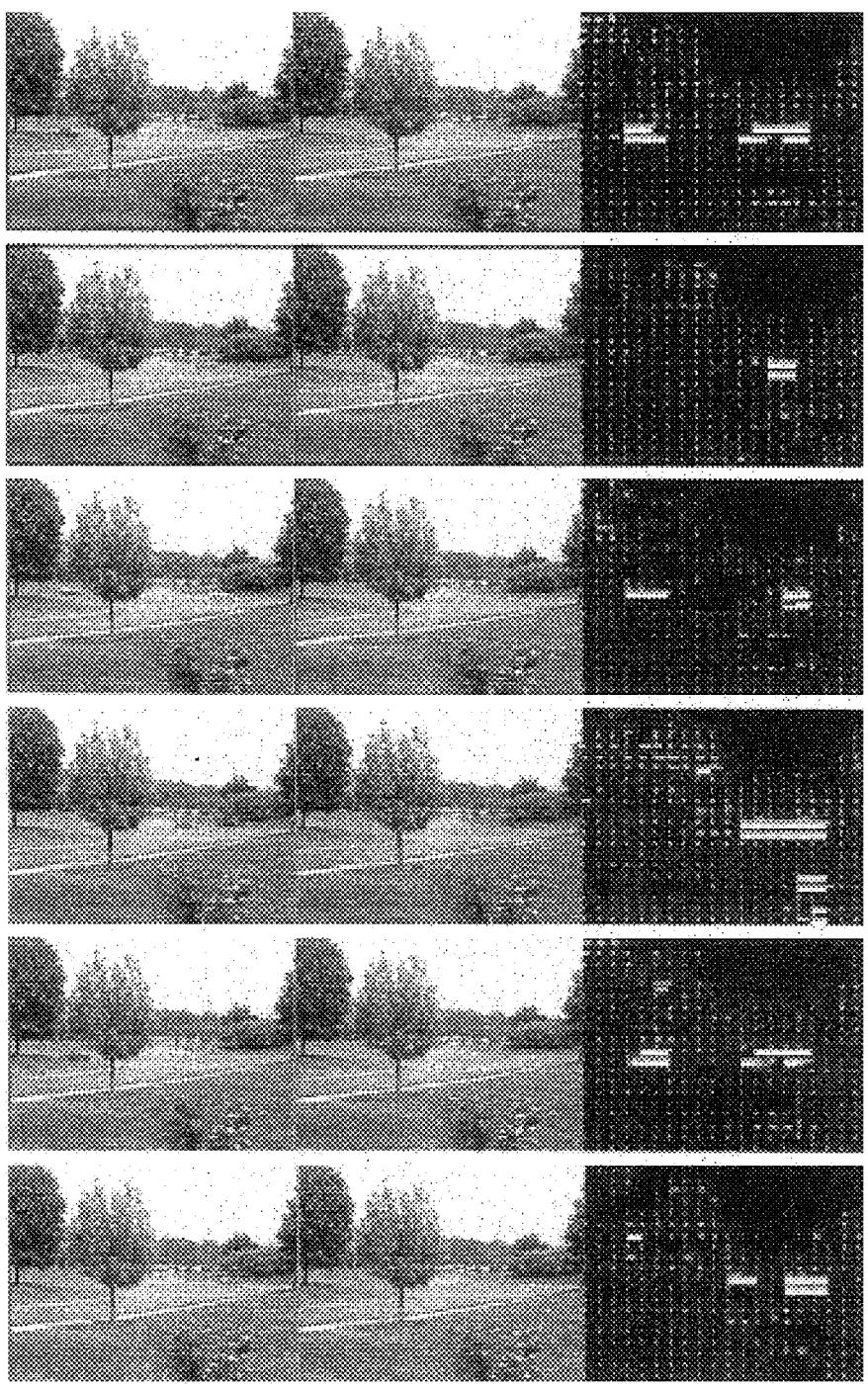
FIG. 10 shows results from a sequence of a road with waving trees, wherein are shown: left: input signal, middle: predicted signal, right: block-wise response of the detection measures, wherein green represents $r_1$, pink represents $r_2$, and white represents detection in a block.

The detection of events was either associated with a non-acceptable false alarm rate or the detection was compromised when focus was given to reducing the false alarm rate. The algorithm in accordance with the invention was able to detect events of interest in the land and simulated events on the ocean front as shown in FIG. 10. Note that the algorithm is largely able to handle waving trees automatically without any parameter adjustments for different blocks, with the exception of very large movements, as in the fourth image, The essence of the approach is depicted in FIGS. 9 and 10. Observation as well as prediction are presented for comparison. Visually, one can conclude that the prediction is rather close to the actual observation for the background component. On the other hand, prediction quality deteriorates when non-background structures appear in the scene. A more elaborate technique to validate prediction is through the detection process as shown in FIG. 10 which shows results from a sequence of a road with waving trees, wherein are shown: left: input signal, middle: predicted signal, right: block-wise response of the detection measures, wherein green represents $r_1$, pink represents $r_2$, and white represents detection in a block.

A Quantitative evaluation of the method can be considered through the ROC (Receiver-Operator Characteristic) curves. FIG. 13 illustrates the ROC characteristics of our method for the sequence of the ocean front (FIG. 1). In FIG. 13, the receiver-operator characteristic (ROC) curves are shown for a sequence for (i) mixture-of-Gaussians model, (ii) non-parametric kernels, and (iii) an embodiment in accordance with the present invention.

Also shown for comparison purposes are the ROC curves for the existing techniques in FIG. 14, which shows a receiver-operator characteristic (ROC) curves for another sequence for (i) mixture-of-Gaussians model, (ii) non-parametric kernels, and (iii) an embodiment in accordance with the present invention.

As can be seen from the curves, there was a substantial improvement in the results as compared to existing methods. Most of this improvement was observed in the region of the ocean front and the blowing grass; the improvement in the static parts of the scene, although quite significant, were not as marked and the performance of all three methods can be considered satisfactory in these regions.

Figure 11:
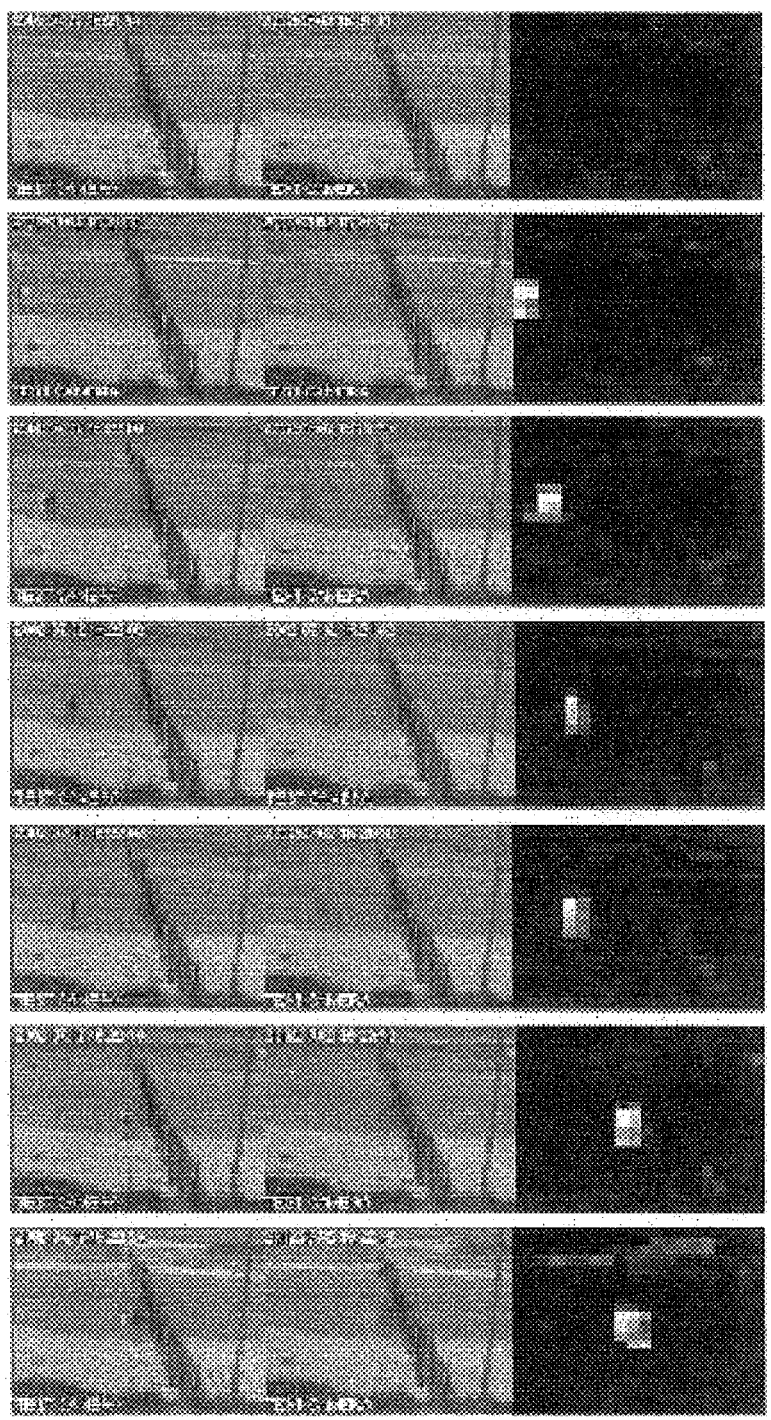
FIG. 11 shows results from a sequence, wherein are shown: left: input signal, middle: predicted signal, right: block-wise response of the detection measures.

The second scene we consider is a typical traffic monitoring scene where the trees were blowing due to the wind (FIG. 13). Results comparable to existing methods were obtained for the static parts of the scene (like the road). At the same time, false detections in the tree area was significantly reduced as compared to traditional methods. This was achieved without any manual parameter adjustments and objects even behind the trees (but visible in spots through the holes in the structure) were detected in some cases. These objects would have been impossible to detect with traditional methods that typically have to rely on pixel neighborhood analysis to remove outliers and thus lack the ability to correlate far away pixels. The ROC curve for this sequence is shown in FIG. 11.

A prediction-based on-line method for the modeling of dynamic scenes has been disclosed. A novel aspect of the present invention is the integration of a powerful set of filter operators within a linear prediction model towards the detection of events in a dynamic scene. Furthermore, on-line adaptation techniques have been disclosed to maintain the selection of the best filter operators and the prediction model and provably optimum detection measures have been developed that are adaptive to the complexity of the scene.

Figure 12:
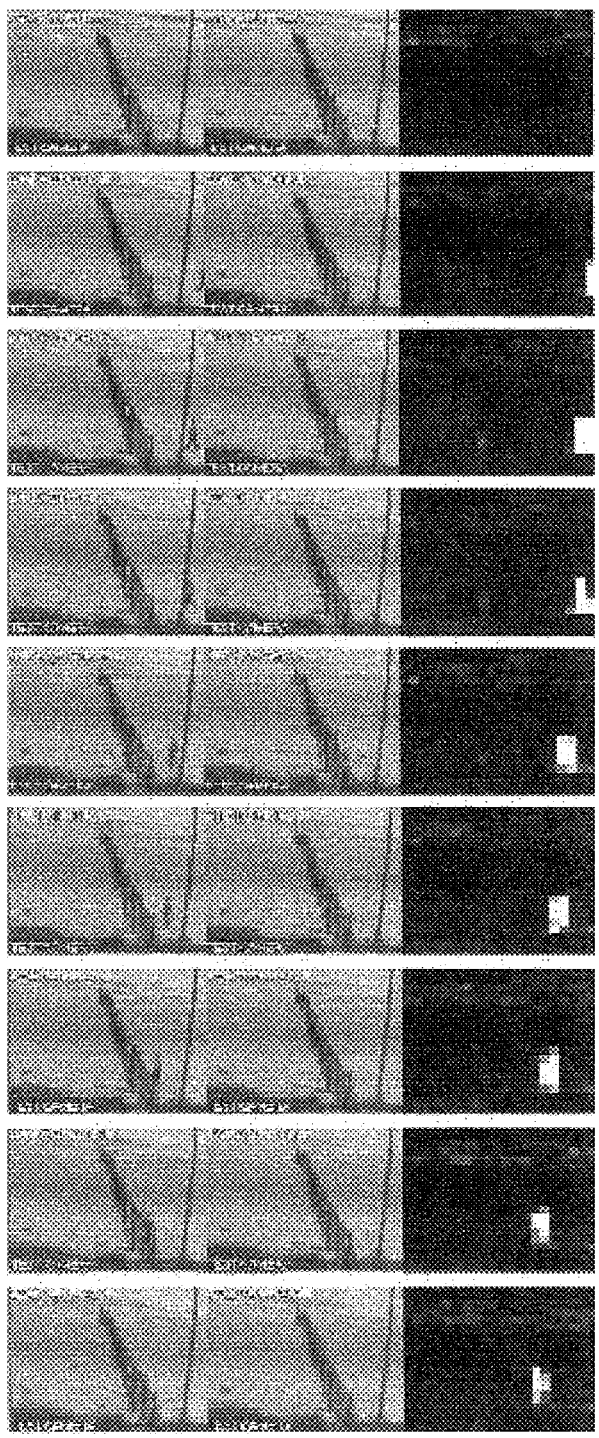
FIG. 12 shows results from another sequence, wherein in the later stages, a person is detected in spite of hiding behind a fence.

The approach has been tested and validated using a challenging setting, including the detection of events on the coast line and the ocean front as shown in FIGS. 10 and 12. Large scale experiments that involved real events (FIGS. 10 and 12) as well as simulated ones were conducted (FIG. 9). FIG. 12 shows results from another sequence, wherein in the later stages, a person is detected in spite of hiding behind a fence. The technique in accordance with an aspect of the present invention was able to detect such events with a minimal false alarm rate. Detection performance was a function of the complexity of the observed scene. High variation in the observation space reflected to a mechanism with limited discrimination power. The method was able to adapt with global and local illumination changes, weather changes, changes of the natural scene, etc. Validation has been performed by comparing the technique in accordance with the present invention with the state-of-the-art methods in background adaptation (FIGS. 2 and 14). The method in accordance with an aspect of the invention could meet and surpass in some cases the performance of these techniques for stationary scenes, while being able to deal with more complex and evolving natural scenes.

It will be understood that the present method operates optionally with any or all of an imaging device such as an electronic camera, a programmable computer, and an image viewing device or screen, and other apparatus known in the art. It will be further understood by one of ordinary skill in the art to which it pertains that, while the invention has been described by way of preferred embodiments, various changes, alterations, and substitutions may be made without departing from the spirit of the invention which is defined by the claims following.

What is claimed is:

1. A method for scene modeling and change detection in an image, comprising the steps of:
   computing optical flow for said image;
   performing an invariant transformation such that image pixel intensity is transformed and evaluated in an illumination-invariant space;
   forming a background model in a highdimensional space;
   utilizing results of said computing optical flow and of said invariant transformation as features in said background model;
   utilizing said background model to estimate probability for a current input to belong to the background;
   providing a first and a second indication whenever said probability is respectively above and below a given threshold;
   adding said current input to said image background model whenever said probability is above said threshold;
   adding said current input to said image background model with a low probability whenever said probability is below said threshold; and
   performing morphological operations on said pixel-level detection for outputting detection.

2. A method as itcited in claim 1, wherein said background model is developed in a high-dimensional space using kernel density estimation.

3. Apparatus for scene modeling and change detection in an image, comprising:
   means for computing optical flow for said image;
   means for performing an invariant transformation such that image pixel intensity is transformed and evaluated in an illumination-invariant space;
   means for forming a background model in a high-dimensional space;
   means for utilizing results of said computing optical flow and of said invariant transformation as features in said background model;
   means for utilizing said background model to estimate probability for a current input to belong to the background;
   means for providing a first and a second indication whenever said probability is respectively above and below a given threshold;
   means for adding said current input to said image background model whenever said probability is above said threshold;
   means for adding said current input to said image background model with a low probability whenever said probability is below said threshold; and
   means for performing morphological operations on said pixel-level detection for outputting detection.

* * * * *